United States Patent
Kobayashi et al.

(10) Patent No.: US 10,412,017 B2
(45) Date of Patent: Sep. 10, 2019

(54) TRANSFER DEVICE, TRANSFER METHOD, AND COMPUTER PROGRAM PRODUCT

(71) Applicant: Kabushiki Kaisha Toshiba, Minato-ku (JP)

(72) Inventors: Yuta Kobayashi, Kawasaki (JP); Takahiro Yamaura, Kawasaki (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 0 days.

(21) Appl. No.: 15/908,386

(22) Filed: Feb. 28, 2018

(65) Prior Publication Data
US 2019/0081903 A1     Mar. 14, 2019

(30) Foreign Application Priority Data

Sep. 13, 2017  (JP) ................ 2017-175973

(51) Int. Cl.
*H04L 12/873* (2013.01)
*H04L 1/18* (2006.01)
*H04L 12/805* (2013.01)
*G06F 13/16* (2006.01)
*H04L 12/851* (2013.01)
*H04L 12/865* (2013.01)
(Continued)

(52) U.S. Cl.
CPC ........ *H04L 47/522* (2013.01); *G06F 13/1605* (2013.01); *H04L 1/1887* (2013.01); *H04L 47/245* (2013.01); *H04L 47/36* (2013.01); *H04L 47/365* (2013.01); *H04L 47/6215* (2013.01); *H04L 47/6275* (2013.01); *H04L 1/0002* (2013.01)

(58) Field of Classification Search
CPC ...... H04L 47/522; H04L 1/1887; H04L 47/36
See application file for complete search history.

(56) References Cited

U.S. PATENT DOCUMENTS

| 8,171,213 B2 | 5/2012 | Adachi |
| 8,811,419 B2 | 8/2014 | Isobe |
| 2006/0067311 A1 | 3/2006 | Ogata |

(Continued)

FOREIGN PATENT DOCUMENTS

| JP | 2006-101401 | 4/2006 |
| JP | 2007-249357 | 9/2007 |

(Continued)

OTHER PUBLICATIONS

Intel Ethernet Controller 1210 Datasheet, 866 pages.

*Primary Examiner* — Anez C Ebrahim
(74) *Attorney, Agent, or Firm* — Oblon, McClelland, Maier & Neustadt, L.L.P.

(57) ABSTRACT

According to an embodiment, a transfer device includes one or more hardware processors configured to function as a control unit and a first transfer unit. The control unit is configured to, by referring to scheduling information indicating a schedule of a timing at which data transfer occurs, dynamically control a maximum data request size that transfer of the data from a first storage unit to a second storage unit can be requested without waiting for reception of read completion notification. The first transfer unit is configured to read the data from the first storage unit and transfer the data to the second storage unit in units of maximum data transfer size equal to or less than the maximum data request size.

11 Claims, 16 Drawing Sheets

(51) Int. Cl.
  *H04L 12/863* (2013.01)
  *H04L 1/00* (2006.01)

(56) References Cited

U.S. PATENT DOCUMENTS

| | | | |
|---|---|---|---|
| 2008/0225891 A1* | 9/2008 | Cave | H04L 47/10 370/472 |
| 2015/0067282 A1* | 3/2015 | Kobayashi | G06F 3/0619 711/158 |
| 2016/0127250 A1* | 5/2016 | McCormick | H04L 47/283 370/235 |

FOREIGN PATENT DOCUMENTS

| | | |
|---|---|---|
| JP | 2013-27007 | 2/2013 |
| JP | 5293516 | 9/2013 |

* cited by examiner

_US 10,412,017 B2_

TRANSFER DEVICE, TRANSFER METHOD, AND COMPUTER PROGRAM PRODUCT

CROSS-REFERENCE TO RELATED APPLICATIONS

This application is based upon and claims the benefit of priority from Japanese Patent Application No. 2017-175973, filed on Sep. 13, 2017; the entire contents of which are incorporated herein by reference.

FIELD

Embodiments described herein relate generally to a transfer device, a transfer method, and a computer program product.

BACKGROUND

In the fields of industrial networks connecting industrial equipment in factories and in-vehicle networks connecting controllers in vehicles, high real-time performance is required. In recent years, the use of Ethernet (registered trademark) has progressed in industrial networks, in-vehicle networks and the like, and various real-time Ethernet standards have been proposed.

DETAILED DESCRIPTION

According to an embodiment, a transfer device includes one or more hardware processors configured to function as a control unit and a first transfer unit. The control unit is configured to, by referring to scheduling information indicating a schedule of a timing at which data transfer occurs, dynamically control a maximum data request size that transfer of the data from a first storage unit to a second storage unit can be requested without waiting for reception of read completion notification. The first transfer unit is configured to read the data from the first storage unit and transfer the data to the second storage unit in units of maximum data transfer size equal to or less than the maximum data request size.

Embodiments will be described in detail below with reference to the accompanying drawings.

First Embodiment

First, examples of standards used in fields such as industrial networks and in-vehicle networks that require high real-time performance will be described.

For example, standardization of time-sensitive networking (TSN) as a standard realizing real-time property on Ethernet (registered trademark) has been advanced in IEEE 802.1 TSN Task. TSN includes multiple standards. TSN is an extension of Audio/Video Bridging (AVB) which realizes low delay property used in professional audio and the like. TSN is a standard aiming at realizing high reliability in addition to higher real-time performance than AVB in order to be applicable to industrial networks, in-vehicle networks, and the like.

When transmission of a frame of high priority occurs, IEEE 802.1 Qbu/802.3br, which is one of the TSN standards, suspends transmission of a frame being transmitted and interrupts the transmission of the high priority frame. Furthermore, IEEE 802.1 Qbv, which is one of the TSN standards, controls transmission timings of frames for each traffic class by controlling a plurality of transmission queues. In this way, by using real-time Ethernet such as TSN, it is possible to reduce the network delay related to the transmission of data requiring real time property.

Meanwhile, the range defined by the real-time Ethernet standard such as TSN is the network processing between the Network Interface Card (NIC) and the network. However, when actually constructing the system, it is necessary to consider processing between the host and the NIC.

Figure 1A:
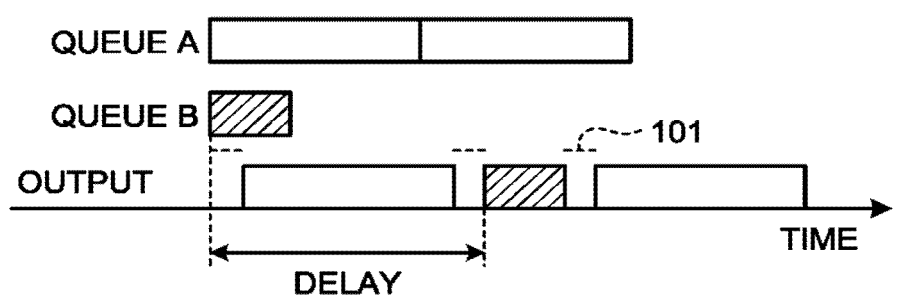
FIG. 1A is a diagram for explaining a relationship between access granularity, delay, and throughput.
Figure 1B:
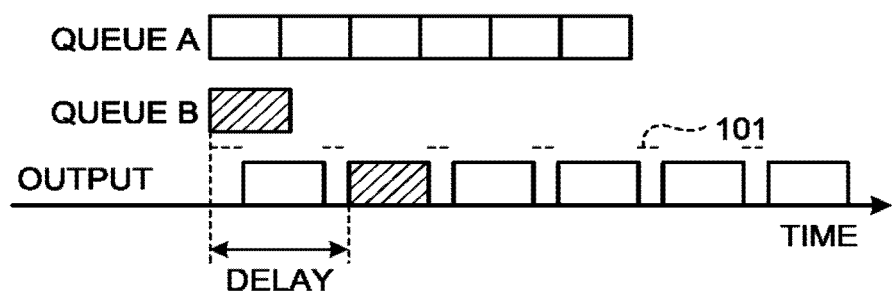
FIG. 1B is a diagram for explaining a relationship between access granularity, delay, and throughput.

FIGS. 1A and 1B are diagrams for explaining a relationship between access granularity, delay, and throughput. Pith reference to FIGS. 1A and 1B, an influence due to a difference in access granularity (access size) of a Direct Memory Access Controller (DMAC) or the like for transferring data from a host side memory to an NIC side queue (buffer) will be described.

The access granularity of queue A of FIG. 1A is greater than the access granularity of queue A of FIG. 1B. As in the queue A of FIG. 1A, when the access granularity is large, the data size that can be requested to be transferred at one time increases, so that an overhead including time for DMA control decreases. Therefore, a throughput increases. However, since the processing time for one request is prolonged, the delay (waiting time) of the data transfer of the subsequent queue B becomes long.

In contrast, if the access granularity is small like the queue A in FIG. 1B, the processing time for one request is shortened, so that the delay of the data transfer of the subsequent queue B becomes short. However, since the data size that can be requested to be transferred at once becomes small, the throughput decreases.

If the delay is simply minimized, the access granularity may be minimized. However, in the real-time Ethernet standard such as TSN, best-effort type traffic is transmitted and received on the same network together with traffic requiring real time property. Therefore, it is required to maximize the throughput within the allowable transfer delay range.

Example of Functional Configuration

Figure 2:
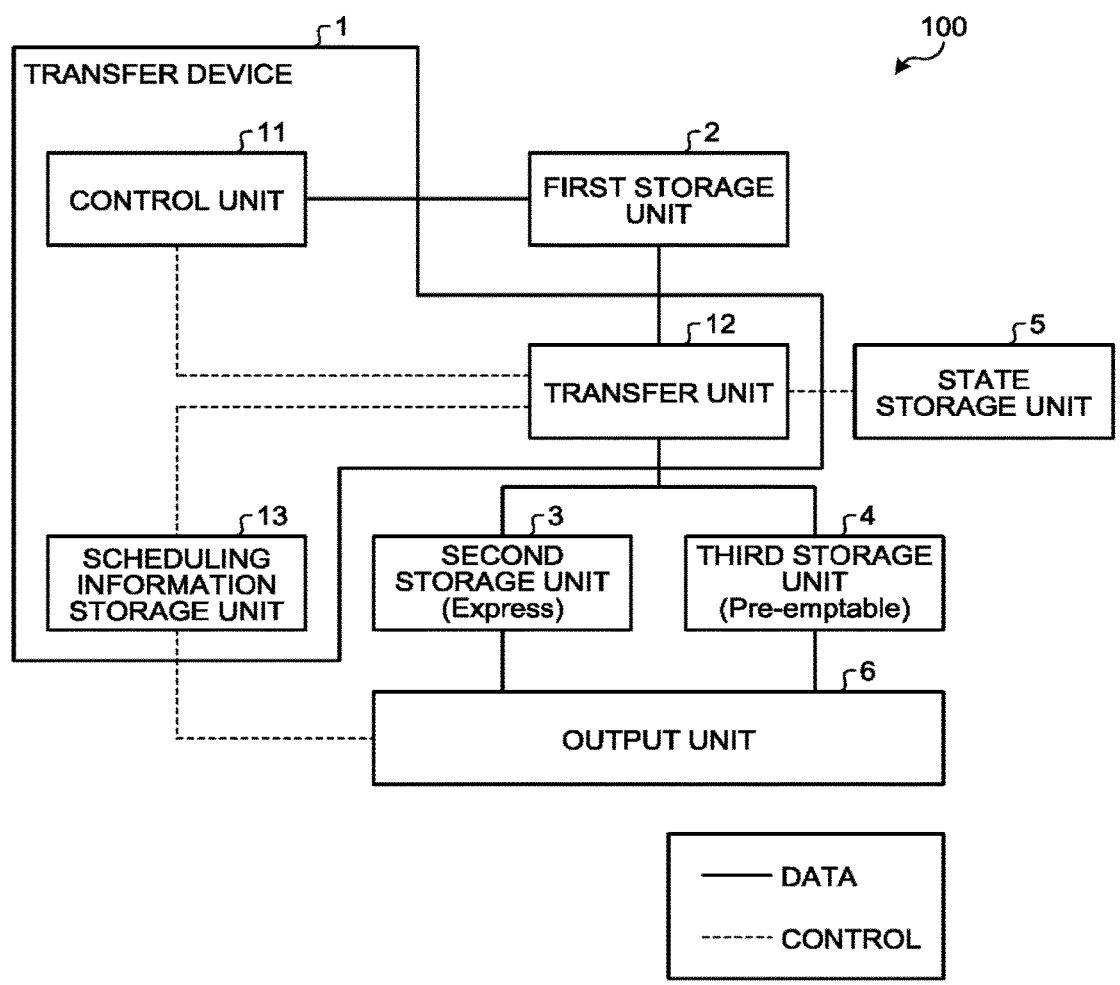
FIG. 2 is a diagram illustrating an example of a functional configuration of a communication device according to a first embodiment.

FIG. 2 is a diagram illustrating an example of a functional configuration of a communication device 100 according to a first embodiment. The communication device 100 according to the first embodiment includes a transfer device 1, a first storage unit 2, a second storage unit 3, a third storage unit 4, a state storage unit 5, and an output unit 6. The transfer device 1 includes a control unit 11, a transfer unit 12, and a scheduling information storage unit 13.

The communication device 100 transfers data to, for example, equipment connected to the output unit 6. The connection between the output unit 6 and the equipment may be wired or wireless. The equipment connected to the output unit 6 is, for example, communication equipment. In the communication device 100 according to the first embodiment, when the transfer unit 12 receives an instruction from the control unit 11, the transfer unit 12 copies the data in the first storage unit 2 to the second storage unit 3 or the third storage unit 4. The output unit 6 outputs the data written in the second storage unit 3 or the third storage unit 4 to the equipment based on the scheduling information stored in the scheduling information storage unit 13. Details of the scheduling information will be described later.

The specific form of the communication device 100 may be arbitrary. The communication device 100 is, for example, a personal computer, a server device, a dedicated large-scale integration (LSI), a field programmable gate array (FPGA), or the like.

The control unit 11 controls the entire communication device 100. Specifically, the control unit 11 controls the transfer unit 12 (initialization, data transfer instruction, and the like), for example. Further, for example, the control unit 11 generates data such as a frame (packet) to be transmitted to the communication equipment connected to the output unit 6. Furthermore, for example, the control unit 11 generates scheduling information.

The specific form of the control unit 11 may be arbitrary. The control unit 11 is, for example, software, a dedicated LSI, an FPGA, or the like. When the control unit 11 is implemented by software, the control unit 11 is implemented by executing the software in, for example, a central processing unit (CPU) and a micro-processing unit (MPU).

The first storage unit 2 stores data. The first storage unit 2 stores, for example, a frame to be transferred to the communication equipment connected to the output unit 6. Furthermore, for example, the first storage unit 2 stores a program executed by the control unit. 11, control information used for controlling the transfer unit 12, session information for performing communication with external communication equipment, and the like.

The second storage unit 3 and the third storage unit 4 have a transmission buffer area for temporarily storing data to be transmitted to external communication equipment.

The data stored in the second storage unit 3 is data (Express) with a higher transfer priority than the data stored in the third storage unit 4. The data stored in the second storage unit 3 is, for example, a control signal that needs to be periodically sent, and real time communication data such as streaming data. The streaming data is, for example, moving image data and audio data.

The data stored in the third storage unit 4 stores data (Pre-emptable) with a lower transfer priority than the data stored in the second storage unit 3. The data stored in the third storage unit 4 is best-effort communication data such as log information.

The scheduling information storage unit 13 stores the scheduling information. The scheduling information indicates the schedule of the timing at which data transfer occurs. Specifically, the timing at which the data stored in the second storage unit 3 and the third storage unit 4 is transmitted to the external communication equipment is defined in the scheduling information. A specific example of the scheduling information is, for example, a gate control list of IEEE 802.1 Qbv.

The specific form of the first storage unit 2, the second storage unit 3, the third storage unit 4, and the scheduling information storage unit 13 may be arbitrary. Each of the first storage unit 2, the second storage unit the third storage unit 4, and the scheduling information storage unit 13 is a storage device such as, for example, a static random access memory (SRAM), a synchronous dynamic random access memory (SRAM), a solid state drive (SSD), a hard disk drive (HDD), and a memory device such as an SD card. The first storage unit 2, the second storage unit 3, the third storage unit 4, and the scheduling information storage unit 13 may be physically configured by a plurality of storage devices. The first storage unit 2, the second storage unit 3, the third storage unit 4, and the scheduling information storage unit 13 may be implemented by logically dividing an area of a single storage device.

The transfer unit 12 transfers the data stored in the first storage unit 2 to the second storage unit 3 or the third storage unit 4 based on the information specified by the control unit 11. The information designated by the control unit 11 includes, for example, the address of the read source, the destination address, the size of the data to be transferred, and the like.

The specific form of the transfer unit 12 may be arbitrary. The transfer unit 12 is, for example, a DMAC. In the first embodiment, a case where the transfer unit 12 is a DMAC will be described as an example. The transfer unit 12 can suspend the data transfer being executed and interrupt another data transfer.

The state storage unit 5 stores state information indicating the state of the data whose transfer has been interrupted by a transfer interruption. The state information includes, for example, the control information of the transfer unit 12 (for example, DMAC), the size of the transferred data, and the like. After the data transfer started by the transfer interruption is completed, the transfer unit 12 restarts the interrupted data transfer by referring to the state information.

The output unit 6 sends the data stored in the second storage unit 3 and the third storage unit 4 at the timing defined in the above-described scheduling information. This makes it possible to send the data transmitted from the communication device 100 to external communication equipment at a predetermined time. That is, it is possible to guarantee the transmission timing of data requiring real time communication.

Specifically, the output unit 6 executes processing such as MAC processing of Ethernet (registered trademark), processing of PHY, TCP/IP, and the like. When the transfer of the data in the second storage unit 3 having a higher priority is ready during the transfer the data of the third storage unit 4, the output unit 6 temporarily suspends the transfer of the data in the third storage unit 4 and interrupts the transfer of the data in the second storage unit 3.

Control (initialization, output instruction, and the like) of the output unit 6 is performed by the control unit 11, for example.

Specific applications to be operated by the communication device 100 in FIG. 2 described above may be arbitrary. Specific applications to be operated by the communication device 100 in FIG. 2 are, for example, an in-vehicle system, and a factory automation system.

In the in-vehicle system, for example, data requiring real-time property related to automatic driving, braking control and the like is stored in the second storage unit 3. Infotainment such as a car navigation system, and data such as running records are stored in the third storage unit 4, for example.

In factory automation, data requiring real time property such as control signals of each control device such as a programmable logic controller (PLC) and an I/O device is stored in the second storage unit 3. The operation status of each device and data such as production management are stored in the third storage unit 4, for example.

The above-described scheduling information indicates that data transfer may occur; and whether or not the data transfer actually occurs depends on whether or not data has been written in the second storage unit 3 or the third storage unit 4. In other words, whether or not data transfer actually occurs depends on the operation of the control unit 11 and the applications located above the control unit 11.

Example of Transfer Method

Figure 3:
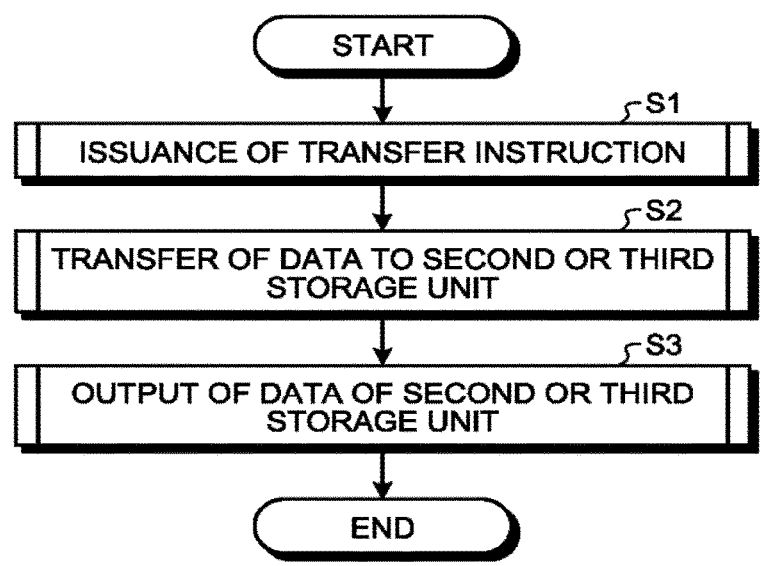
FIG. 3 is a flowchart illustrating an example of a transfer method according to the first embodiment.

FIG. 3 is a flowchart illustrating an example of a transfer method according to the first embodiment. First, the control unit 11 issues an instruction to transfer the data stored in the first storage unit 2 to the second storage unit 3 or the third storage unit 4 (step S1). Specifically, the control unit 11 instructs the transfer unit 12 to transfer the data by notifying the transfer unit 12 of the transfer information. The transfer information includes the size of the data transferred, the read address of the first storage unit the write address of the second storage unit 3 or the third storage unit 4, and the like.

The transfer information may be notified using a descriptor, or may be notified using a register interface. A method of specifying a writing destination includes a method of specifying an address and a method of specifying the writing destination based on a priority.

It is known in advance that data of high priority (first priority) is written to a transmission buffer of the second storage unit 3, and the data of low priority (second priority) is written to the transmission buffer of the third storage unit 4. Therefore, the control unit 11 may not notify the transfer unit 12 of the transfer information including the transfer priority, not the write destination address. When receiving the transfer information including the transfer priority from the control unit 11, the transfer unit 12 decides the write destination based on the transfer priority.

Instead receiving the transfer priority from the control unit 11, the transfer unit 12 may decide the write destination based on the priority added to the header of the transferred data. The priority added to the header is, for example, a priority code point (PCP) of an IEEE 802.1Q frame or the like.

The data in first storage unit 2 is written in advance by, for example, the control unit 11 and the application or the like. The data in the first storage unit 2 is data generated by an application such as file data and control data, for example. Alternatively, for example, the data in the first storage unit 2 may be in the form of a frame (packet) obtained by adding header information and the like for performing communication with external communication equipment to the data generated by the application.

Next, when the transfer unit 12 receives the transfer instruction from the control unit 11, the transfer unit 12 executes a transfer process (step S2). Details of the process in step S2 will be described later with reference to FIG. 4.

Next, with reference to the scheduling information, the output unit 6 transmits the data in the second storage unit 3 or the third storage unit 4 to the external communication equipment at the timing when transmission is permitted (step S3). The output unit 6 refers to the second storage unit 3, for example, at a timing when the transmission process of the second storage unit 3 is permitted, and outputs the data to the external network if data is present. At this time, if there is no data in the second storage unit 3, the output unit 6 may transmit the data stored in the third storage unit 4.

Next, details of the transfer process in step S2 will be described.

Figure 4:
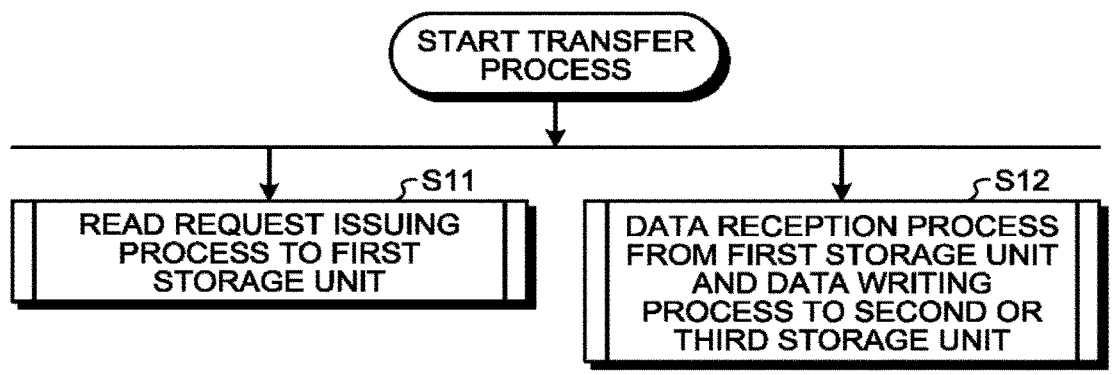
FIG. 4 is a detailed flowchart of a process in step S2.

FIG. 4 is a detailed flowchart of the process in step S2. As illustrated in FIG. 4, the transfer unit 12 asynchronously executes a read process (step S11) of issuing a read request to the first storage unit 2, and a writing process (step S12) of writing the data received from the first storage unit 2 into the second storage unit 3 or the third storage unit 4. Each process will be described with reference to FIGS. 5 and 8.

Example of Read Process

Figure 5:
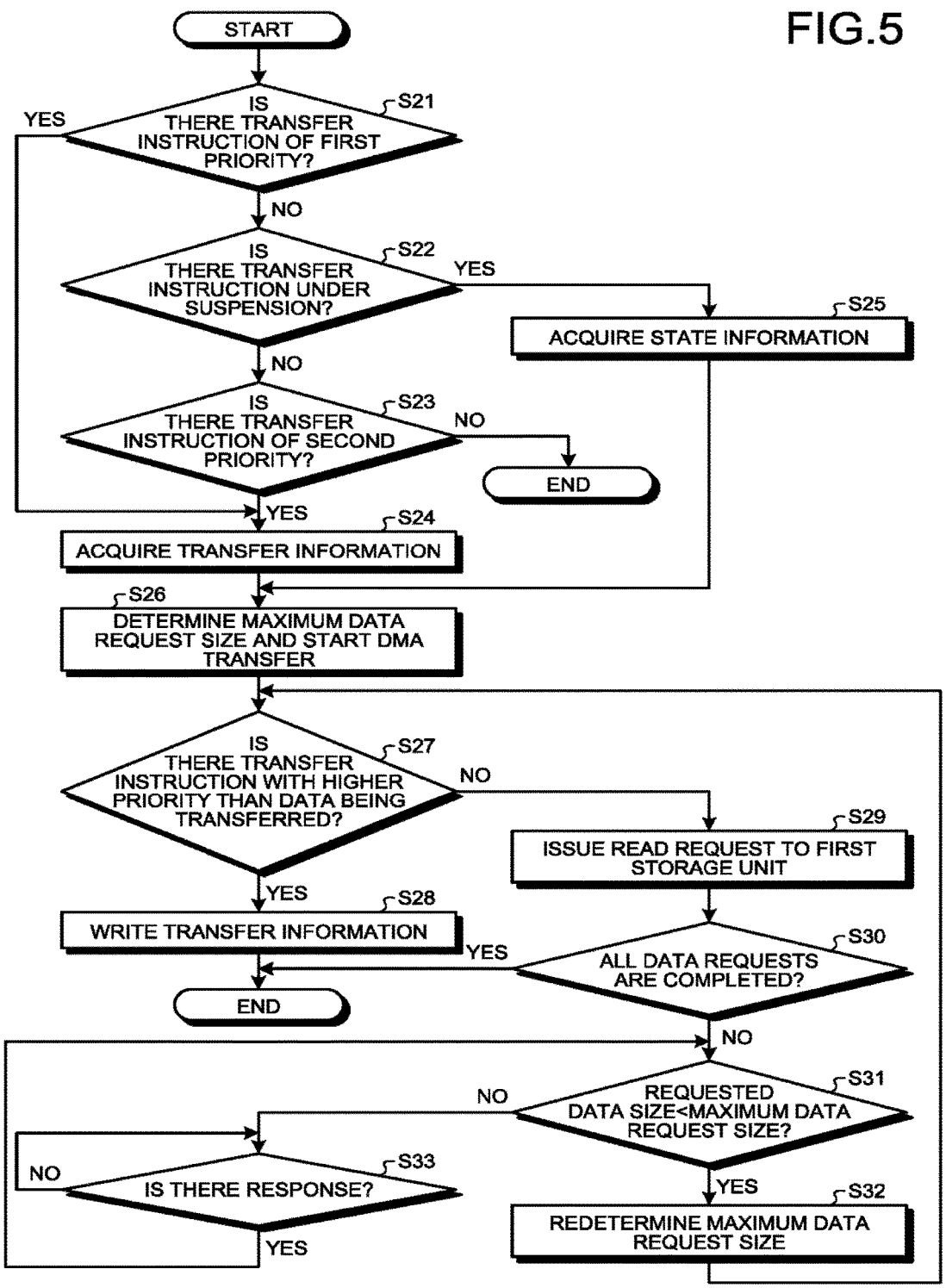
FIG. 5 is a detailed flowchart of a process in step S11.

FIG. 5 is a detailed flowchart of the process in step S11. First, the transfer unit 12 determines whether or not there is a transfer instruction with the first priority (step S21).

When there is a transfer instruction with the first priority (step S21, Yes), the transfer unit 12 acquires transfer information indicating the transfer instruction (step S24).

When there is no transfer instruction with the first priority (No in step S21), the transfer unit 12 determines whether or not there is a transfer instruction under suspension (step S22).

When there is a transfer instruction under suspension (step S22, Yes), the transfer unit 12 acquires the state information from the state storage unit 5 (step S25).

When there is no transfer instruction under suspension (No in step S22), the transfer unit 12 determines whether or not there is a transfer instruction of the second priority (step S23). When there is a transfer instruction of the second priority (step S23, Yes), the transfer unit 12 acquires transfer information indicating the transfer instruction (step S24).

When there is no transfer instruction of the second priority (No in step S23), the process is ended (returning to the start).

Here, in the example of the flowchart of FIG. 5, the transfer unit 12 determines whether or not there is a transfer instruction in the order of the first priority, interruption, and second priority, but may perform control so that the processing of the first priority does not continuously performed.

Furthermore, the start of the process of the flowchart in FIG. 5 is to monitor whether or not there is a transfer instruction; however, the process may be started with the reception of the transfer instruction from the control unit 11 as a trigger. In this case, since there is always one transfer instruction, there is no proceeding to No in step S23. Furthermore, in the case of using the reception of the transfer instruction as a trigger, it is judged whether or not there is a transfer instruction under suspension at the completion of the request issuing process of the first priority. Then, if there is the transfer instruction under suspension, an operation to restart the interrupted transfer instruction is required.

Further, in the first embodiment, for the sake of simplicity, the case where the type of transfer priority is two, namely, the first priority (Express) and the second priority (Preemptable) has been described as an example; however, the type of transfer priority may be three or more. Even in the configuration in the case where there are three or more transfer priorities, the transfer process is executed in the order of the transfer priorities.

Next, when there is a transfer instruction, the transfer unit 12 determines (sets) a maximum data request size and starts DMA transfer (step S25). The transfer instruction includes the size of the data to be transferred, the read address of the data, the write address of the data, the transfer priority of the data, and the like.

In processing transfer instructions of the first and second priorities, the transfer unit 12 acquires the transfer information from the control unit 11, and specifies the transfer instruction from the transfer information (step S24 described above).

When restarting the interrupted transfer instruction, the transfer unit 12 acquires state information from the state storage unit 5 and specifies the transfer instruction under suspension from the state information (step S25 described above). When restarting the transfer instruction under suspension, the transfer unit 12 additionally acquires, from the state information, information indicating to what position the data has been transferred and the like.

Here, the maximum data request size will be described. At the time of data transfer, the transfer unit 12 issues a request in which the read address and the read size are specified to the first storage unit 2. The transfer of the data specified by the request is completed by receiving a response (reading completion notification) corresponding to the request from the first storage unit 2. The maximum data request size is the data size that transfer of the data from the first storage unit 2 to the second storage unit 3 or the third storage unit 4 can be requested without waiting for reception of the read completion notification. The maximum value of the maximum data request size is determined based on the specification of the bus connecting the first storage unit 2 and the transfer unit 12 (DMAC), and the first storage unit 2 and the transfer unit 12.

Figure 6:
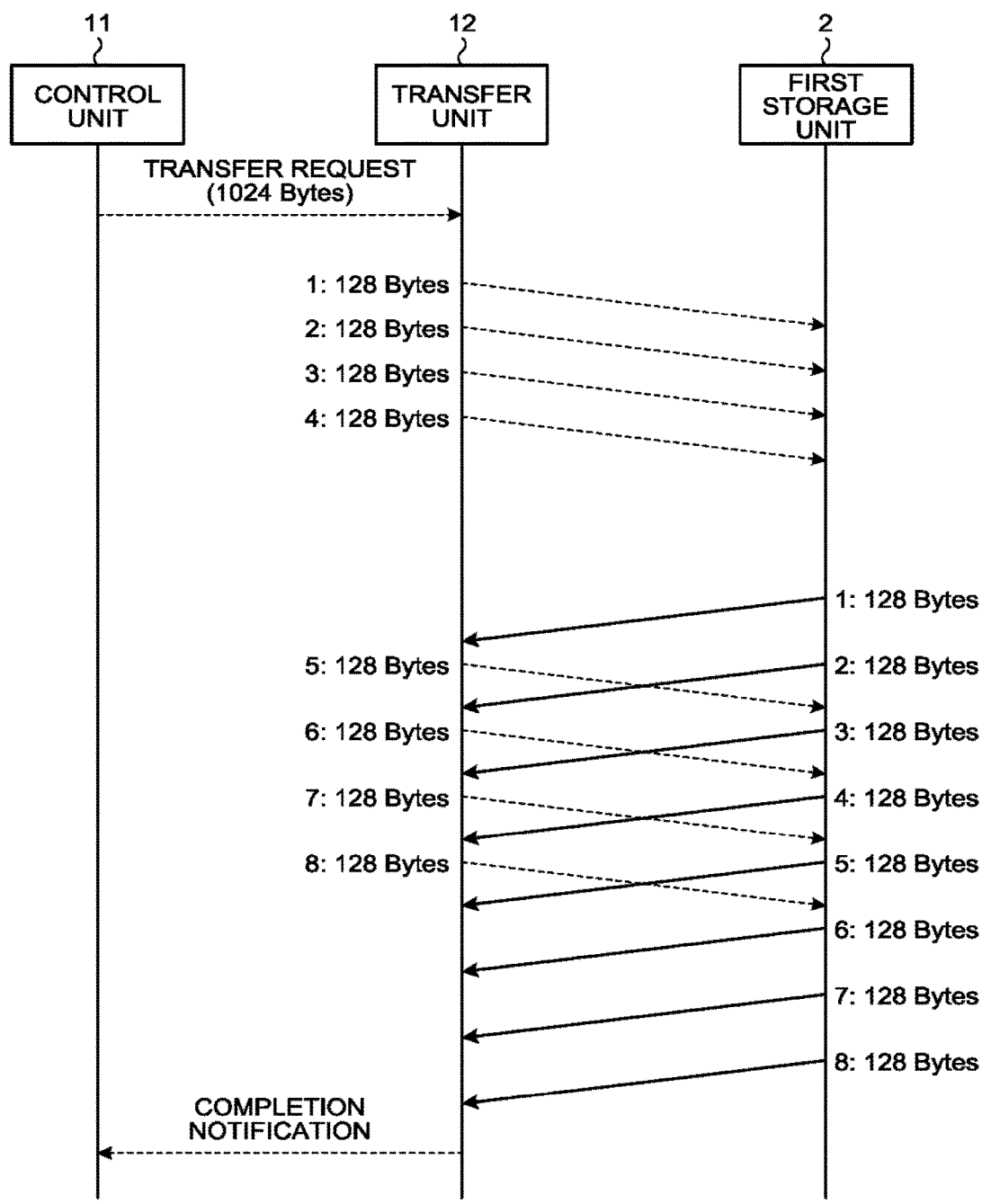
FIG. 6 is a diagram for explaining an example of a maximum data request size and a maximum data transfer size according to the first embodiment.

FIG. 6 is a diagram for explaining an example of a maximum data request size and a maximum data transfer size according to the first embodiment. FIG. 6 illustrates an example in which the transfer unit 12 transfers data of 1024 bytes when the maximum data transfer size indicating the size of data that can be transferred with one request is 128 bytes and the maximum data request size is 512 bytes.

FIG. 6 illustrates only processing performed between the transfer unit 12 and the first storage unit 2 for the sake of simplicity, and other processing is omitted. First, the control unit 11 inputs a transfer instruction (transfer request) for transferring data of 1024 bytes stored in the first storage unit 2 to the transfer unit 12. When receiving a transfer instruction from the control unit 11, the transfer unit 12 sequentially issues a 128-byte read request to the first storage unit 2.

In the example of FIG. 6, the maximum data request size of 512 bytes is reached when four requests are issued. Therefore, until the transfer unit 12 receives the data requested by issuing the request from the first storage unit 2 as a response, the transfer unit 12 is in a wait state in which no subsequent request is issued. After entering the wait state, the transfer unit 12 issues a subsequent request every time the transfer unit 12 receives a response from the first storage unit 2. In the example of FIG. 6, for example, the transfer unit 12 issues a fifth request after receiving the response of the first request.

As the maximum data request size increases, subsequent read requests can be issued without waiting for the data transfer from the first storage unit 2, so that the transfer efficiency increases. However, when the data transfer to the second storage unit 3 is interrupted during the data transfer to the third storage unit 4, data to be transferred to the second storage unit 3 cannot be read from the first storage unit 2 until completion of data transfer that has already issued the request.

That is, the larger the maximum data request size is, the greater the latency until interrupting the data transfer to the second storage unit 3 is.

Therefore, in determining the maximum data request size in step S26 of FIG. 5, the transfer unit 12 determines whether or not there is a possibility that another transfer instruction will interrupt during data transfer by referring to the scheduling information. Then, the transfer unit 12 adjusts the maximum data request size based on the determination result.

For example, at a timing when a data transfer interruption to the second storage unit 3 may occur during data transfer to the third storage unit 4, the transfer unit 12 reduces the maximum data request size (for example, controls a value to be less than the threshold). As a result, when a data transfer interruption occurs, the transfer process can be switched immediately.

At a timing when a data transfer interruption may not occur, the transfer unit 12 increases the maximum data request size. Thus, the efficiency (throughput) of data transfer can be maximized. The threshold referred to when increasing the maximum data request size and the threshold referred to when reducing the maximum data size may be the same or different.

The maximum data request size determined by the processing in step S26 may be determined in advance or may be calculated each time.

In the method of determining the maximum data request size in advance, for example, a value A used when an interrupt may occur, and a value B used when no interrupt occurs are specified in advance at the time of initialization of the transfer unit 12 (DMAC) or the like. That is, at the timing when a transmission process of higher priority frame may occur during DMA processing, the transfer unit 12 uses the value A as the maximum data request size, and otherwise uses the value B to execute the DMA processing.

As a method of calculating the maximum data request size each time, for example, there is a method in which the transfer unit 12 specifies the time until occurrence of the possibility that data transfer with a high priority occurs from the scheduling information, to calculate the maximum data request size based on the storage device being used and the bandwidth of the bus to which the storage device is connected.

Note that determination (designation, calculation, and the like) of the maximum data request size may be performed by the control unit 11 instead of the transfer unit 12.

Figure 7:
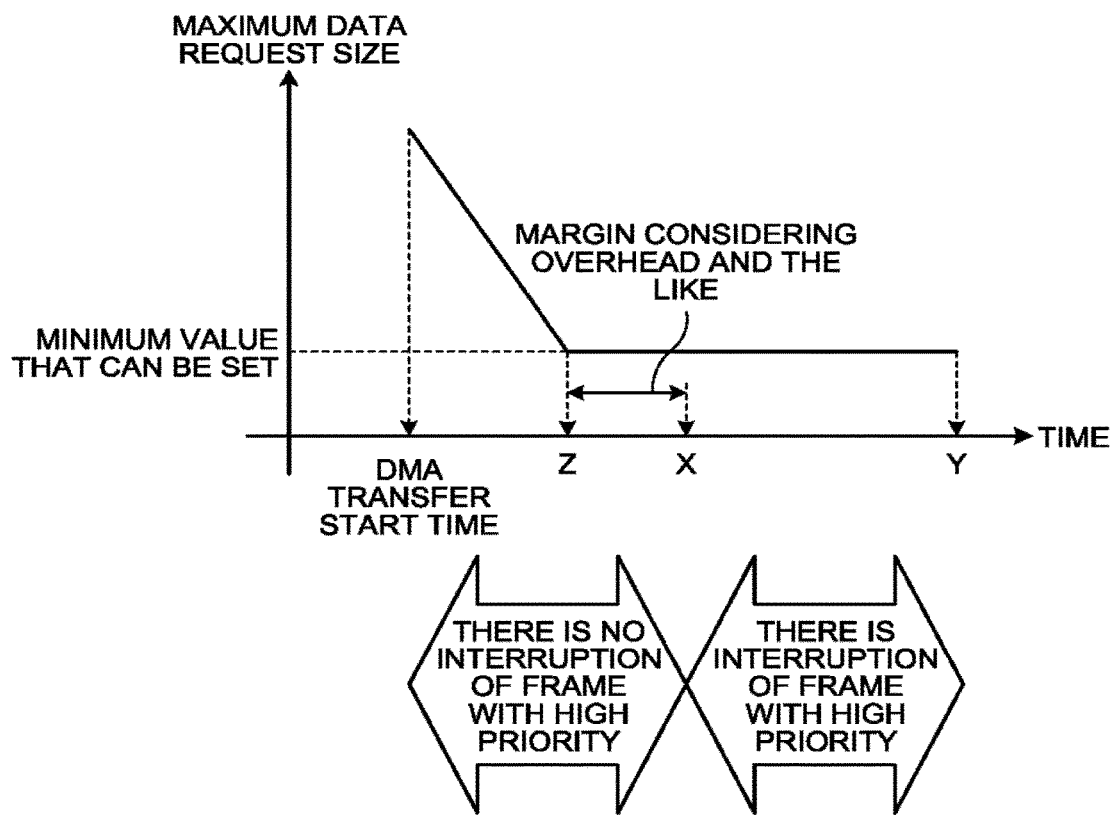
FIG. 7 is a view for explaining a calculation example of a maximum data request size according to the first embodiment.

FIG. 7 is a diagram for explaining a calculation example of the maximum data request size according to the first embodiment. By referring to the scheduling information, the control unit 11 or the transfer unit 12 can calculate time X until the possibility that transmission process of higher priority frame than the frame under DMA processing occurs may occur. Further, when the used storage device and the bandwidth of the bus are known, the control unit 11 or the transfer unit 12 can also calculate the time Y until the DMA processing of the data size designated by the transfer information acquired by the processing in step S24 in FIG. 5 is completed.

When the time Y is smaller than the time X, there is no possibility that transmission process of a frame with high priority occurs during DMA processing. Therefore, the control unit 11 or the transfer unit 12 can maximize the throughput, for example, by determining the maximum data request size to be a value equal to or larger than the data size specified by the transfer information.

When the time Y is longer than the time X, there is a possibility that transmission process of a frame with high priority occurs during DMA transfer. Therefore, when starting DMA transfer, for example, the control unit 11 or the transfer unit 12 determines the maximum data transfer size to be a large value (for example, a value equal to or larger than the threshold value), and decreases the maximum data transfer size each time a read request is issued (see FIG. 7). In this case, it is desirable that the maximum data transfer size becomes the minimum value that can be set (setting in which the delay is minimized) when time Z elapses. Therefore, the control unit 11 or the transfer unit 12 determines the maximum data request size to be the minimum value, for example, after the time Z elapses from the start of the DMA transfer.

The minimum value depends on the specification of the transfer unit 12 (DMAC) and the specification of the bus. The time Z is calculated by an arbitrary calculation formula taking into consideration the processing overhead and the like. The processing for redetermining the maximum data request size is performed in the process in step S52 described later, for example.

As another method of redetermining the maximum data request size, for example, from the start of DMA transfer to the time Z ($Z<X\leq Y$), the control unit 11 or the transfer unit 12 may determine the maximum data request size to be a value calculated by multiplying a bandwidth (storage unit, bus, and the like) by time 5. Then, the control unit 11 or the transfer unit 12 may determine the maximum data request size to be the minimum value, for example, after the time Z elapses from the start of the DMA transfer. In this case, the maximum data request size is redetermined at time Z, for example, in the process in step S32 described later.

The above-described me of determining the maximum data request size is merely an example and is not limited thereto. In addition, the scheduling information referred to when determining the maximum data request size uses the scheduling information for determining the timing at which the output unit 6 transmits the data to the external device but is not limited thereto. For example, resource scheduling information of the CPU and the virtual machine may be used. Further, a plurality of pieces of scheduling information may be referred to.

In the first embodiment, since the transfer priority is only two of the first and second priorities, only the data transfer process of the second priority has the possibility of occurrence of the interruption. Therefore, in the case of the data transfer process of the first priority, it is desirable to set the maximum data request size to the maximum value that can be set.

In the case of a transfer instruction restarted from the interruption, the transfer unit 12 may redetermine the maximum data request size by referring to the scheduling information, for example. Alternatively, for example, the transfer unit 12 may store the value of the maximum data request size determined before the interruption in the state storage unit 5, and may use the value after restarting.

Although there are only two types of transfer priorities in the first embodiment, the first and second priorities, the number of kinds of transfer priorities may be three or more. In this case, the transfer unit 12 may determine the maximum data request size for each transfer priority. For example, the transfer unit 12 may perform control such that the higher the transfer priority is, the larger the maximum data request size is.

Returning to FIG. 5, next, the transfer unit determines whether there is a transfer instruction higher in transfer priority than the data being transferred (step S27) In the example of FIG. 5, there is a possibility that there is a transfer instruction of data with high transfer priority (first priority) during the transfer of the data with the second priority or during the data transfer restarted after the interruption.

When there is a transfer instruction higher in transfer priority than data being transferred (Yes in step S27), the transfer unit 12 writes the current transfer information to the state storage unit 5 as state information (step S28) and ends the processing (returns to the start). As a result, the transfer process of the transfer unit 12 is restarted, and the interrupted data transfer process of the first priority is started by the process of step S21 described above. Upon completion of the transfer process of the first priority, the interrupted transfer process is restarted by the process of step S22 described above.

When there is no transfer instruction higher in transfer priority than the data being transferred (No in step S27), the transfer unit 12 issues a read request to the first storage unit 2 (step S29). Next, the transfer unit 12 determines whether or not issuing of the request for all the data (data corresponding to a data size designated by the transfer information) has been completed (step S30).

When issuing of all data requests has been completed (step S30, Yes), the processing is ended (returning to the start).

When issuing of all data requests has not been completed (step S30, No), the transfer unit 12 continues the request issuing process. At this time, the transfer unit 12 determines whether or not the requested data size (the size of the data for which the request has been issued to the first storage unit 2 but the response has not been received) is smaller than the maximum data request size (step S31).

When the requested data size is smaller than the maximum data request size (step S31, Yes), the transfer unit 12 executes the next request issuing process. Specifically, the transfer unit 12 redetermines the maximum data request size (step S32) and executes the process of step S27. It is to be noted that the process in step S32 is omitted if the condition for redetermining the maximum data request size (for example, whether or not the above-described time Z elapses) is not satisfied.

When the requested data size is equal to or larger than the maximum data request size (No in step S31), the transfer unit 12 determines whether or not there is a response to the request issued in the process in step S29 (step S33). When there is no response (step S33, No), the transfer unit 12 waits until there is a response. If there is a response (step S33, Yes), the processing returns to step S31.

The process of receiving the response (data specified by the request) (the process of writing the data received from the first storage unit 2 illustrated in FIG. 8 to the second storage unit 3 or the third storage unit 4 to be described later) is asynchronously executed. Therefore, also in the request issuing process illustrated in FIG. 5, it is necessary to be able to refer to the information of the data reception process by the process in step S33.

Example of Writing Process

Next, with reference to FIG. 8, a process of writing data received from the first storage unit 2 to the second storage unit 3 or the third storage unit 4 will be described.

Figure 8:
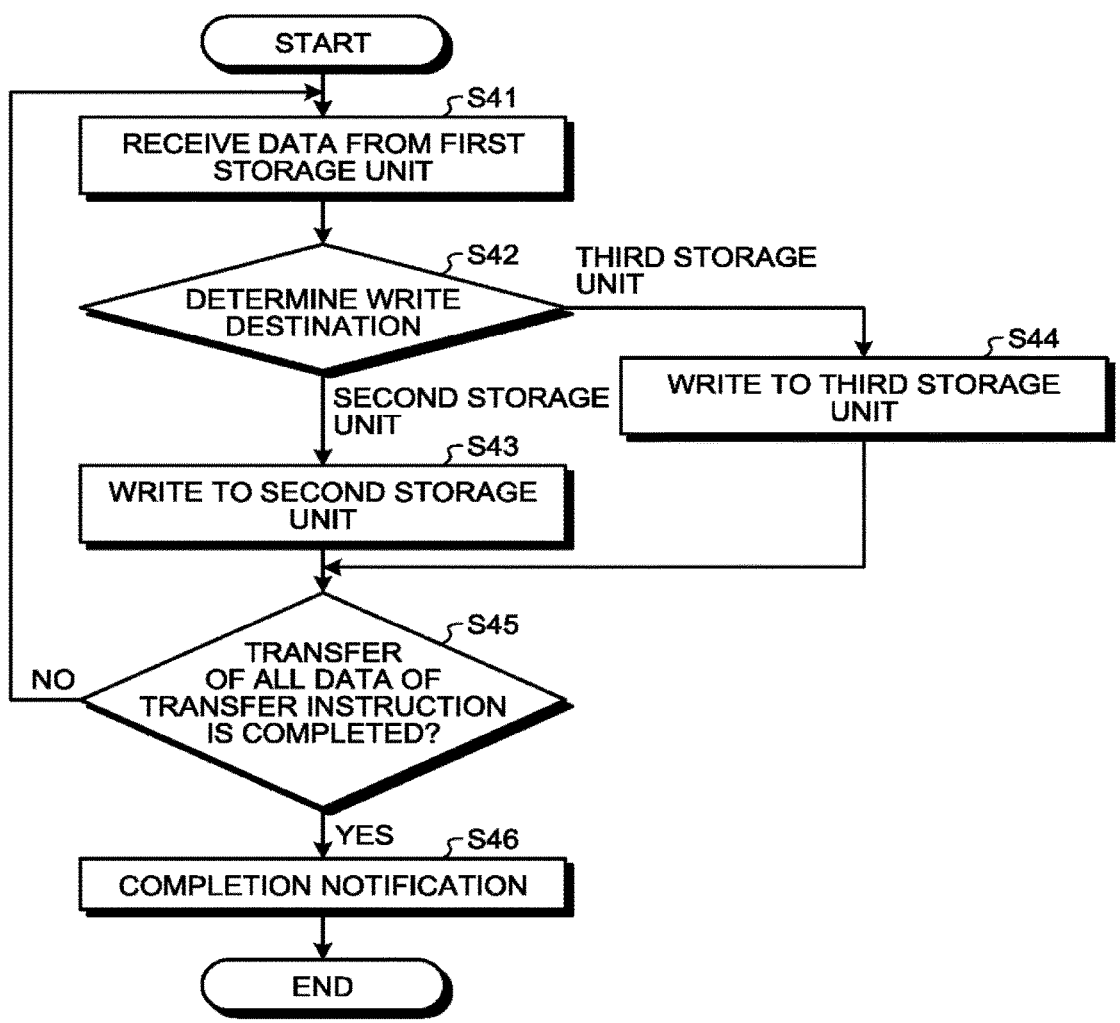
FIG. 8 is a detailed flowchart of a process in step S12.

FIG. 8 is a detailed flowchart of the process in step S12. First, the transfer unit 12 receives a response (data designated by the request) from the first storage unit (step S41). Next, the transfer unit 12 determines the write destination of the data received in the process in step S41 (step S42). The transfer unit 12 determines the write destination by referring to the request corresponding to the received data, for example.

When the writing destination is the second storage unit 3 (step S42, second storage unit), the transfer unit 12 writes the data received in the process in step S41 into the second storage unit 3 (step S43). When the writing destination is the third storage unit 4 (step S42, third storage unit), the transfer unit 12 writes the data received in the process in step S41 into the third storage unit 4 (step S44).

Next, the transfer unit 12 determines whether or not the transfer of all the data designated by the transfer instruction has been completed (step S45). When the transfer of all the data specified by the transfer instruction has not been completed (No in step S45), the processing returns to step S41.

When the transfer of all the data specified by the transfer instruction is completed (step S45, Yes), the transfer unit 12 notifies the control unit 11 of the completion notification (step S46) and ends the processing (returns to the start).

A notification method of the completion notification to the control unit 11 may be arbitrary. As a notification method of completion notification, for example, there are a method of notifying by an interrupt signal, a method of notifying by exchanging a descriptor, and the like.

The transfer unit 12 also explicitly notifies the output unit 6 that the data transfer is completed and the transmission data is prepared in the transmission buffer (the second storage unit 3 or the third storage unit 4). The method of notifying the output unit 6 may be arbitrary. As a method of notifying the output unit 6, for example, there are a method in which the transfer unit 12 directly notifies the output unit 6 by issuing a command, a method in which flag information indicating whether or not transmission data is present in the transmission buffer is provided and the output unit 6 refers to the flag information, and the like.

As described above, in the communication device 100 (transfer device 1) according to the first embodiment, the control unit 11 or the transfer unit 12 changes the maximum data request size based on the scheduling information. As a result, when a transfer process of high priority data occurs during a transfer process of low priority data, the communication device 100 (transfer device 1) according to the first embodiment can maximize the overall transfer efficiency while enabling immediate the transfer process to be interrupted.

Second Embodiment

Next, a second embodiment will be described. In the description according to the second embodiment, the same explanation as in the first embodiment will be omitted, and portions different from the first embodiment will be described.

Example of Functional Configuration

Figure 9:
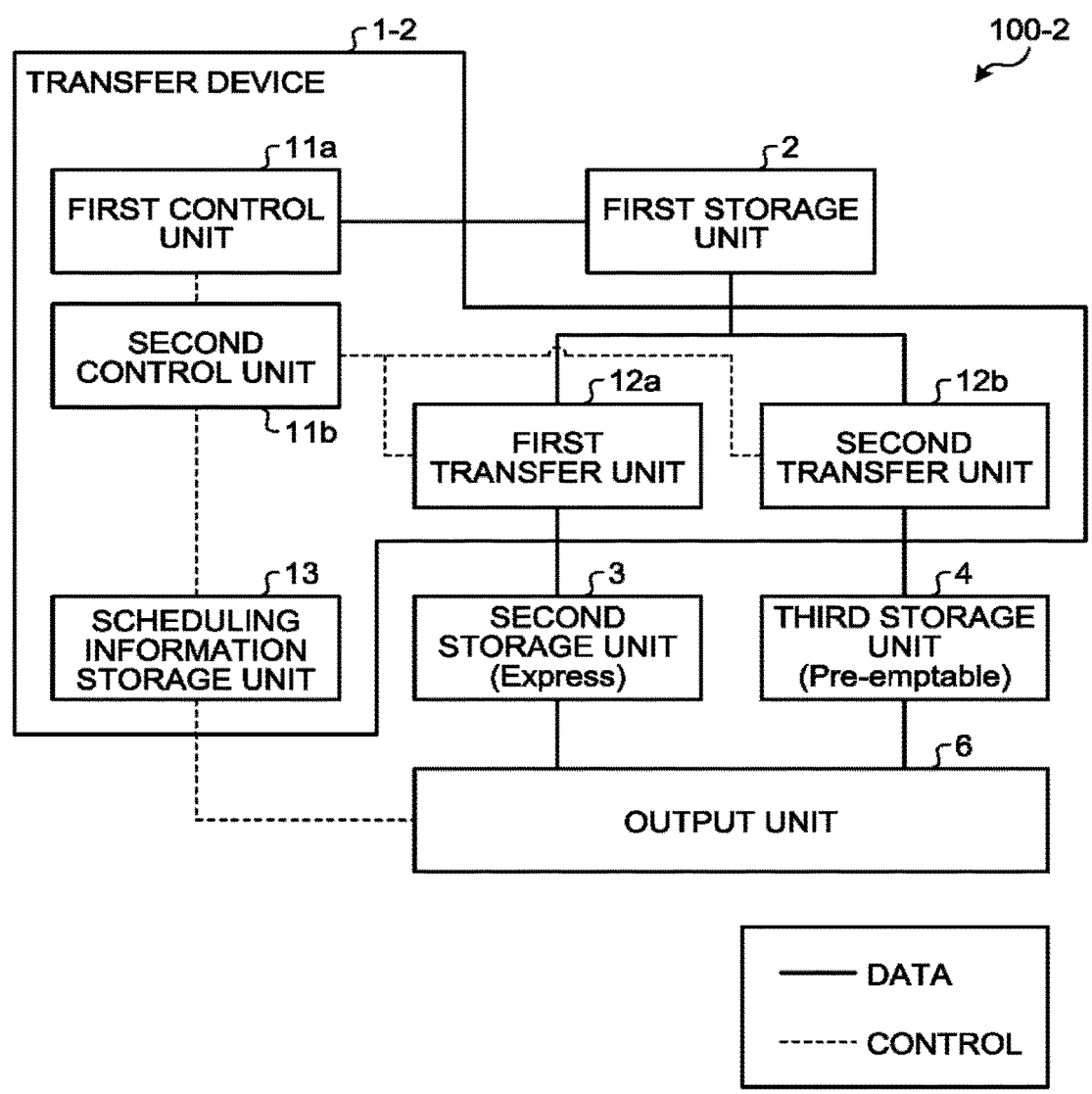
FIG. 9 is a diagram illustrating an example of a functional configuration of a communication device according to a second embodiment.

FIG. 9 is a diagram illustrating an example of a functional configuration of a communication device 100-2 according to the second embodiment. The communication device 100-2 according to the second embodiment includes a transfer device 1-2, the first storage unit 2, the second storage unit 3, the third storage unit 4, and the output unit 6. The transfer device 1-2 includes a first control unit 11a, a second control unit 11b, a first transfer unit 12a, a second transfer unit 12b, and a scheduling information storage unit 13.

In the communication device 100-2 according to the second embodiment, the second control unit 11b receives the instruction from the first control unit 11a and controls the first transfer unit 12a and the second transfer unit 12b so as to copy the data in the first storage unit 2 to the second storage unit 3 or the third storage unit 4. Then, the output unit 6 outputs the data copied to the second storage unit 3 or the third storage unit 4 to the external communication equipment based on the above-described scheduling information.

Specifically, based on the information specified by the first control unit 11a, the second control unit 11b controls the first transfer unit 12a (second transfer unit 12b) so as to transfer the data stored in the first storage unit 2 to the second storage unit 3 (third storage unit 4). The information designated by the first control unit 11a includes, for example, the address of the read source, the destination address, the size of the data to be transferred, and the like. The second control unit 11b can temporarily stop the data transfer process being executed by the second transfer unit 12b.

The first transfer unit 12a copies the data of the first storage unit 2 to the second storage unit 3 according to an instruction from the second control unit 11b.

The second transfer unit 12b copies the data of the first storage unit 2 to the third storage unit 4 according to an instruction from the second control unit 11b. The second transfer unit 11b can temporarily stop the transfer process in response to a stop instruction from the second control unit 11b.

Example of Transfer Method

Figure 10:
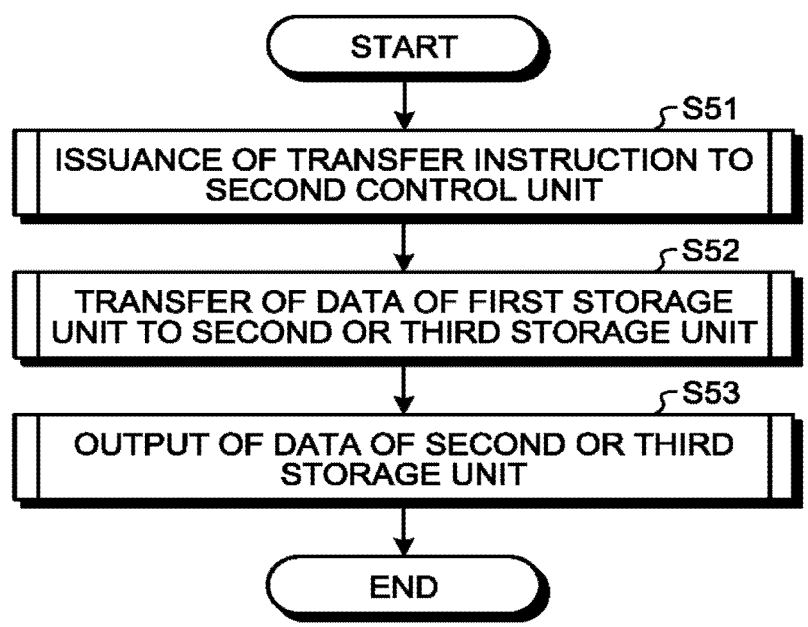
FIG. 10 is a flowchart illustrating an example of a transfer method according to the second embodiment.

FIG. 10 is a flowchart illustrating an example of a transfer method according to the second embodiment. First, the first control unit 11a issues an instruction to transfer the data stored in the first storage unit 2 to the second storage unit 3 or the third storage unit 4 (step S51). Specifically, the first control unit 11a instructs the second control unit 11b to transfer the data by notifying the second control unit 11b of the transfer information. The transfer information includes the size of the data to be transferred, the read address of the first storage unit 2, the write address of the second storage unit 3 or the third storage unit 4, and the like.

Next, when receiving the transfer instruction from the first control unit 11a, the second control unit 11b performs transfer control process of transferring the data of the first storage unit 2 to the second storage unit 3 or the third storage unit 4 (step S52). When transferring the data to the second storage unit 3, the second control unit 11b causes the first transfer unit 12a to execute a transfer process, and when transferring the data to the third storage unit 4, the second control unit 11b causes the second transfer unit 12b to execute a transfer process. Details of the process in step S52 will be described later with reference to FIGS. 11 and 12.

Since the process in step S53 is the same as the description in step S3 in FIG. 3, the description thereof is omitted.

Example of Transfer Control Process

Figure 11:
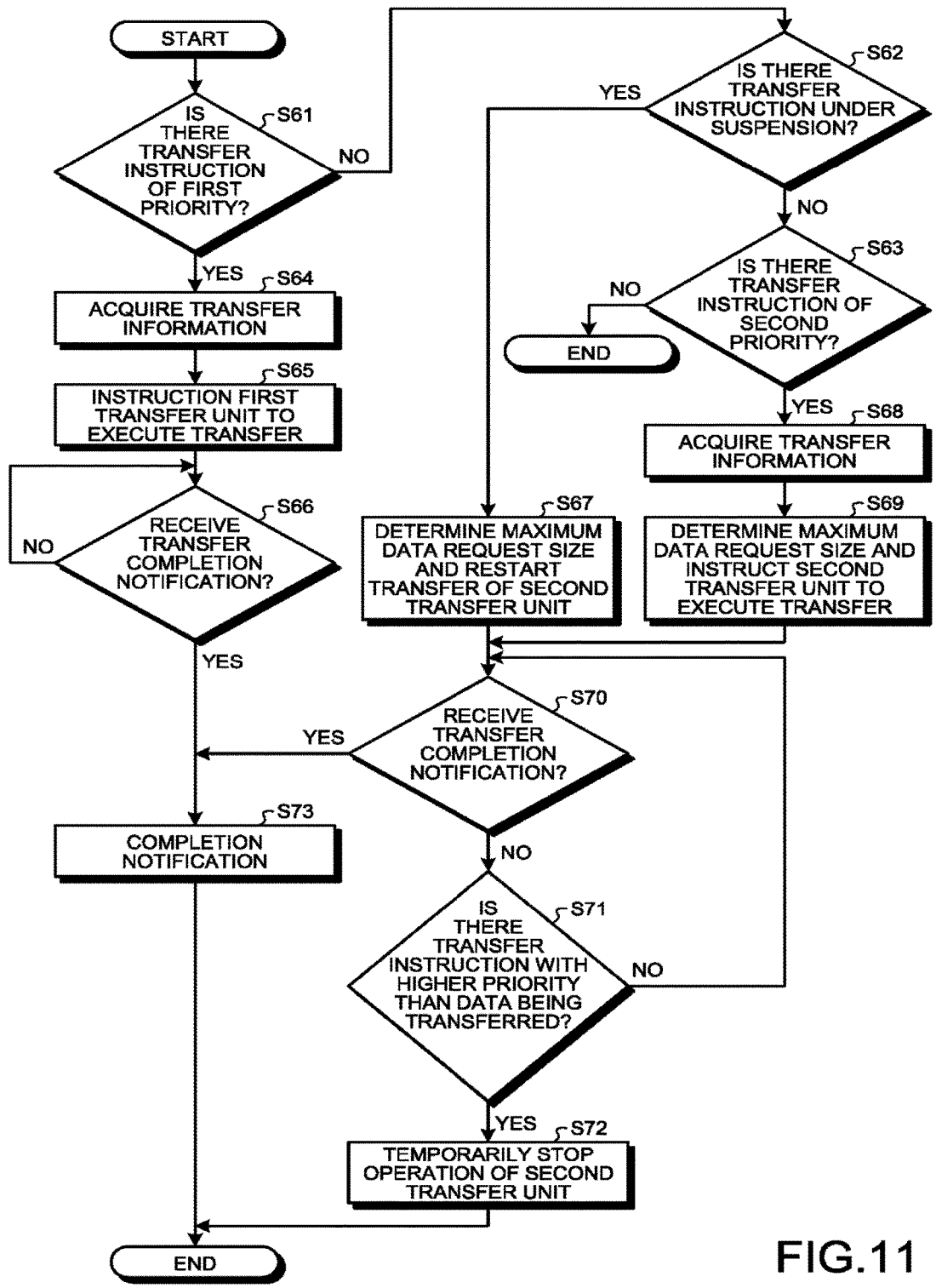
FIG. 11 is a flowchart illustrating an example of processing of a second control unit according to the second embodiment.

FIG. 11 is a flowchart illustrating an example of processing of the second control unit 11b according to the second embodiment. First, the second control unit 11b determines whether or not there is a transfer instruction with the first priority (step S61).

When there is a transfer instruction with the first priority (step S61, Yes), the second control unit 11b acquires transfer information indicating the transfer instruction (step S64). The transfer information includes, for example, the size of data to be transferred, the read address of the data, the write address of the data, and the like. However, in the case of the transfer by the first transfer unit 12a, since the transmission buffer at the write destination becomes the second storage unit 3, the write address may be omitted. Next, the second control unit 11b instructs the first transfer unit 12a to perform transferring to the first transfer unit 12a by inputting the transfer information acquired by the process in step S64 (step S65). Next, the second control unit 11b determines whether or not a transfer completion notification has been received from the first transfer unit 12a (step S66). When the transfer completion notification has not been received (step S66, No), the second control unit 11b waits until receiving the transfer completion notification from the first transfer unit 12a. When the transfer completion notification has been received (step S66, Yes), the second control unit 11b transmits a completion notification indicating that the transfer is completed to the first control unit 11a (step S73). A notification method of the completion notification may be arbitrary. As a notification method of completion notification, for example, there are a notification by an interrupt signal, a notification by exchanging a descriptor, and the like.

When there is no transfer instruction with first priority (No in step S61), the second control unit 11b determines whether or not there is a transfer instruction under suspension (step S62).

When there is a transfer instruction under suspension (step S62, Yes), the second control unit 11b determines the maximum data request size by referring to the above-described scheduling information and restarts the transfer of the second transfer unit 12b (step S67). Next, the second control unit 11b determines whether or not a transfer completion notification has been received from the second transfer unit 12b (step S70). When the transfer completion notification has not been received (step S70, No), the second control unit 11b determines whether or not there is a transfer instruction higher in transfer priority than the data being transferred (step S71). When there is no transfer instruction higher in transfer priority than the data being transferred (step S71, No), the processing returns to step S70. When there is a transfer instruction higher in transfer priority than the data being transferred (Yes in step S71), the second control unit 11b temporarily stops the operation of the second transfer unit 12b (step S72), and ends the processing (returns to the start). When the transfer completion notification has been received (step S70, Yes), the second control unit 11b transmits a completion notification indicating that the transfer is completed to the first control unit 11a (step S73).

When there is no transfer instruction under suspension (No in step S62), the second control unit 11b determines whether or not there is a transfer instruction with second priority (step S63). When there is a transfer instruction with the second priority (step S63, Yes), the second control unit 11b acquires transfer information indicating the transfer instruction (step S60). Next, the second control unit 11b determines the maximum data request size by referring to the scheduling information, and instructs the second transfer unit 12b to perform transferring (step S69). Thereafter, the processing from step S70 to step S73 is executed.

When there is no transfer instruction of the second priority (No in step S63), the processing is ended (returning to the start).

In the example of the flowchart of FIG. 11, the second control unit 11b determines whether or not there is a transfer instruction in the order of the first priority, interruption, and second priority, but may perform control so that the processing of the first priority does not continuously performed.

The start of the processing of the flowchart in FIG. 11 is to monitor whether or not there is a transfer instruction; however, the processing may be started with the reception of the transfer instruction from the first control unit 11a as a trigger. In this case, since there is always one transfer instruction, there is no proceeding to No in step S63. Furthermore, in the case of using the reception of the transfer instruction as a trigger, at the completion of the request issuing process of the first priority, it is judged whether or not there is a transfer instruction under suspension, and if there is the transfer instruction under suspension, an operation to restart the interrupted transfer instruction is required.

In the second embodiment, for the sake of simplicity, the case where the type of transfer priority is two, namely, the first priority (Express) and the second priority (Pre-emptable) has been described as an example; however, the type of transfer priority may be three or more. Also in the configuration in the case where there are three or more transfer priorities, the transfer processing is executed in the order of the transfer priorities.

Figure 12:
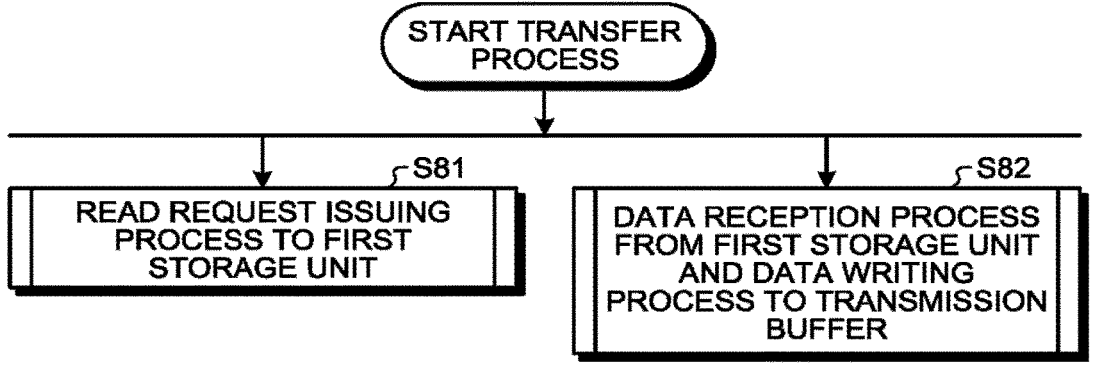
FIG. 12 is a flowchart illustrating an example of a transfer process of first and second transfer units according to the second embodiment.

FIG. 12 is a flowchart illustrating an example of the transfer process of the first transfer unit 12a and the second transfer unit 12b according to the second embodiment. As illustrated in FIG. 12, the first transfer unit 12a (second transfer unit 12b) asynchronously executes a read process (step S81) of issuing a read request to the first storage unit 2, and a writing process (step S82) of writing the data received from the first storage unit 2 into the second storage unit 3 (the third storage unit 4).

Figure 13:
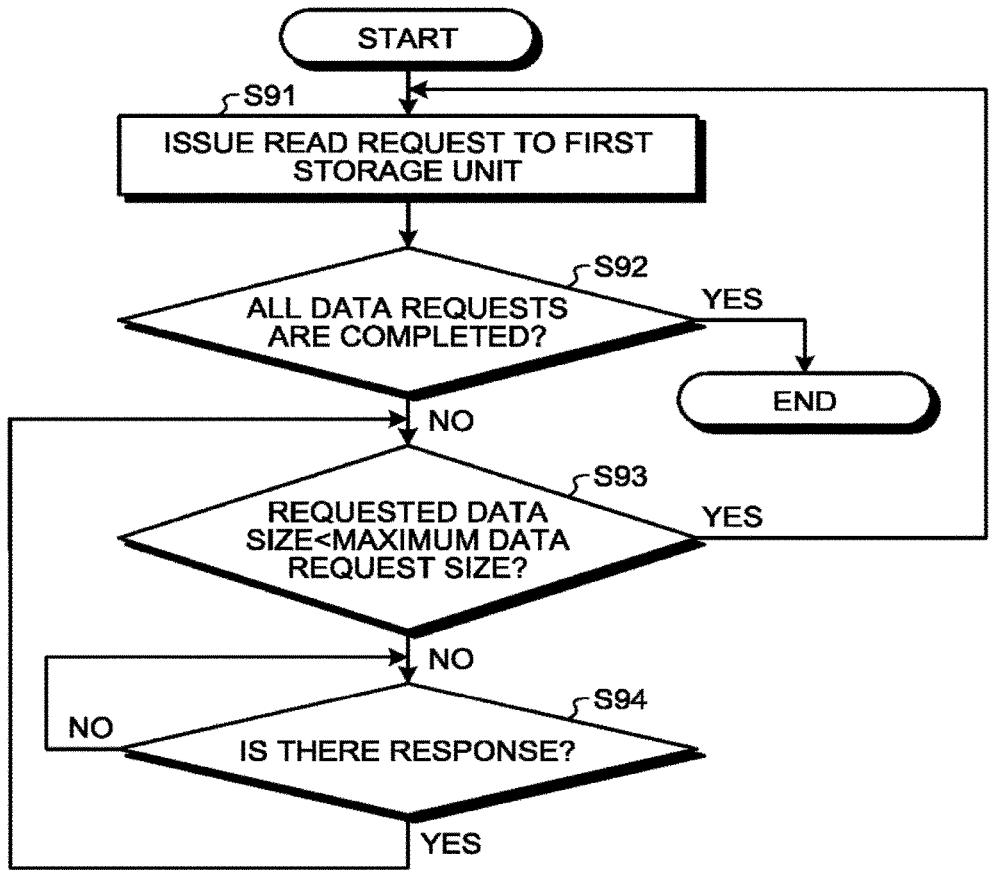
FIG. 13 is a flowchart illustrating an example of a read request issuing process of the first transfer unit according to the second embodiment.

FIG. 13 is a flowchart illustrating an example of the read request issuing process of the first transfer unit 12a according to the second embodiment. First, when receiving a transfer instruction from the second control unit 11b, the first transfer unit 12a issues a read request to the first storage unit 2 (step S91). Next, the first transfer unit 12a determines whether or not issuing of the request for all the data (data corresponding to a data size designated by the transfer information) has been completed (step S92).

When issuing of all data requests has been completed (step S92, Yes), the processing is ended (returning to the start).

When issuing of all data requests has not been completed (step S92, No), the transfer unit 12 continues the request issuing process. At this time, the first transfer unit 12a determines whether or not the requested data size (the size of the data for which the request has been issued to the first storage unit 2 but the response has not been received) is smaller than the maximum data request size (step S93).

When the requested data size is smaller than the maximum data request size (Yes in step S93), the first transfer unit 12a executes the next request issuing process (returns to step S91).

When the requested data size is equal to or larger than the maximum data request size (No in step S93), the first transfer unit 12a determines whether or not there is a response to the request issued in the process in step S91 (step S94). When there is no response (step S94, No), the first transfer unit 12a waits until there is a response. If there is a response (step S94, Yes), the processing returns to step S93.

Figure 14:
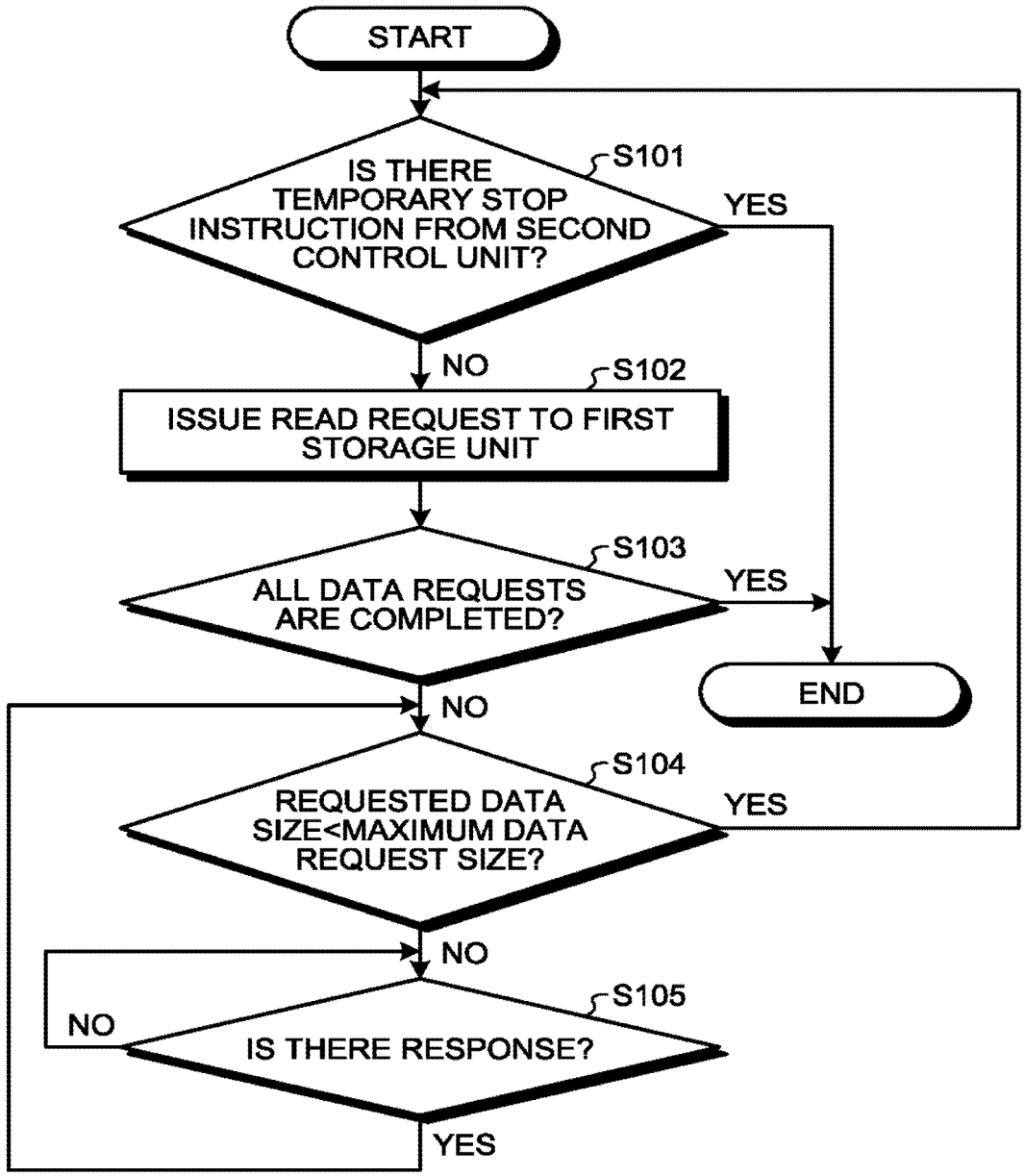
FIG. 14 is a flowchart illustrating an example of a read request issuing process of the second transfer unit according to the second embodiment.

FIG. 14 is a flowchart illustrating an example of the read request issuing process of the second transfer unit 12b according to the second embodiment. First, the second transfer unit 12b determines whether or not there is a temporary stop instruction from the second control unit 11b (step S101).

When there is a temporary stop instruction (Yes in step S101), the processing is ended (returns to the start and waits for the restart instruction from the second control unit 1b). The second transfer unit 12b holds state information and when receiving the restart instruction from the second control unit 11b, restarts the request issuing process from the temporarily stopped state by using the state information.

When there is no temporary stop instruction (step S101, No), the processing proceeds to step S102. Since the processes in steps S102 to S105 is similar to the process in step S91 to step S94 in FIG. 13 described above, description thereof will be omitted. However, in the case of Yes in step S104, the read request issuing process of the second transfer unit 12b is different from that of the first transfer unit 12a in that the processing returns to the process of step S101 and it is determined whether or not a temporary stop instruction is issued from the second control unit 11b.

Figure 15:
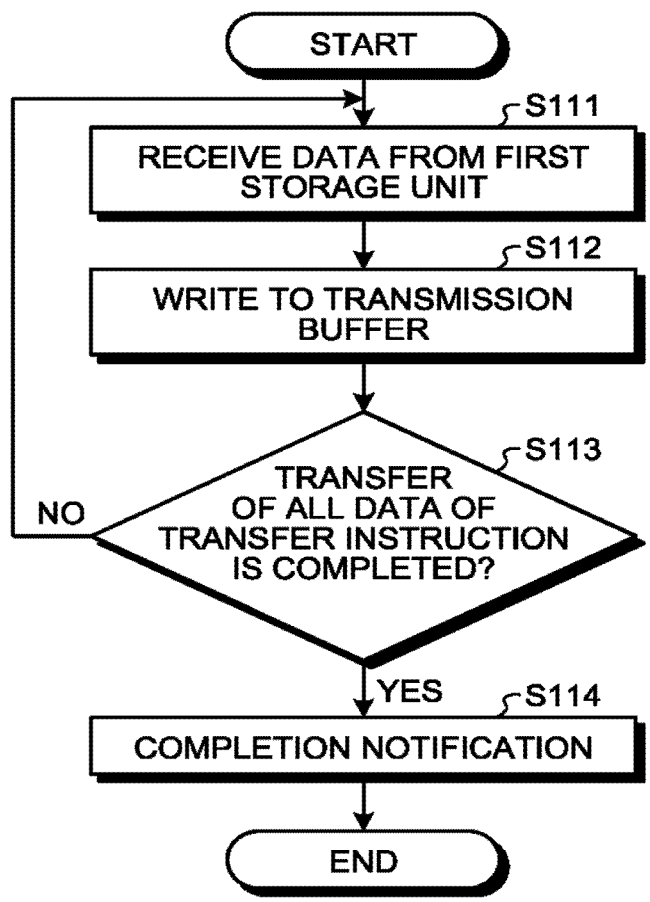
FIG. 15 is a flowchart illustrating an example of a data reception process and a writing process of the first and second transfer units according to the second embodiment.

FIG. 15 is a flowchart illustrating an example of the data reception process and the writing process of the first transfer unit 12a and the second transfer unit 12b according to the second embodiment. First, the first transfer unit 12a (second transfer it 12b) receives data from the first storage unit 2 (step S111). Next, the first transfer unit 12a (second transfer unit 12b) writes the data received by the process in step S111 in the transmission buffer (step S112). The transmission buffer of the first transfer unit 12a is the second storage unit 3, and the transmission buffer of the second transfer unit 12b is the third storage unit 4.

Next, the first transfer unit 12a (second transfer unit 12b) determines whether or not the transfer of all the data designated by the transfer instruction has been completed (step S113). When the transfer of all the data specified by the transfer instruction has not been completed (No in step S113), the processing returns to step S111.

When the transfer of all the data specified by the transfer instruction is completed (step S113, Yes), the first transfer unit 12a (second transfer unit. 12b) notifies the second control unit 11b of the completion notification (step S114) and ends the processing (returns to the start).

As described above, in the communication device 100-2 (transfer device 1-2) according to the second embodiment, the second control unit 11b changes the maximum data request size based on the scheduling information. As a result, it is possible to obtain the same effect as the case of the communication device 100 (transfer device 1) of the first embodiment.

Third Embodiment

Next, a third embodiment will be described. In the description according to the third embodiment, the same explanation as in the first embodiment will be omitted, and portions different from the first embodiment will be described.

Example of Functional Configuration

Figure 16:
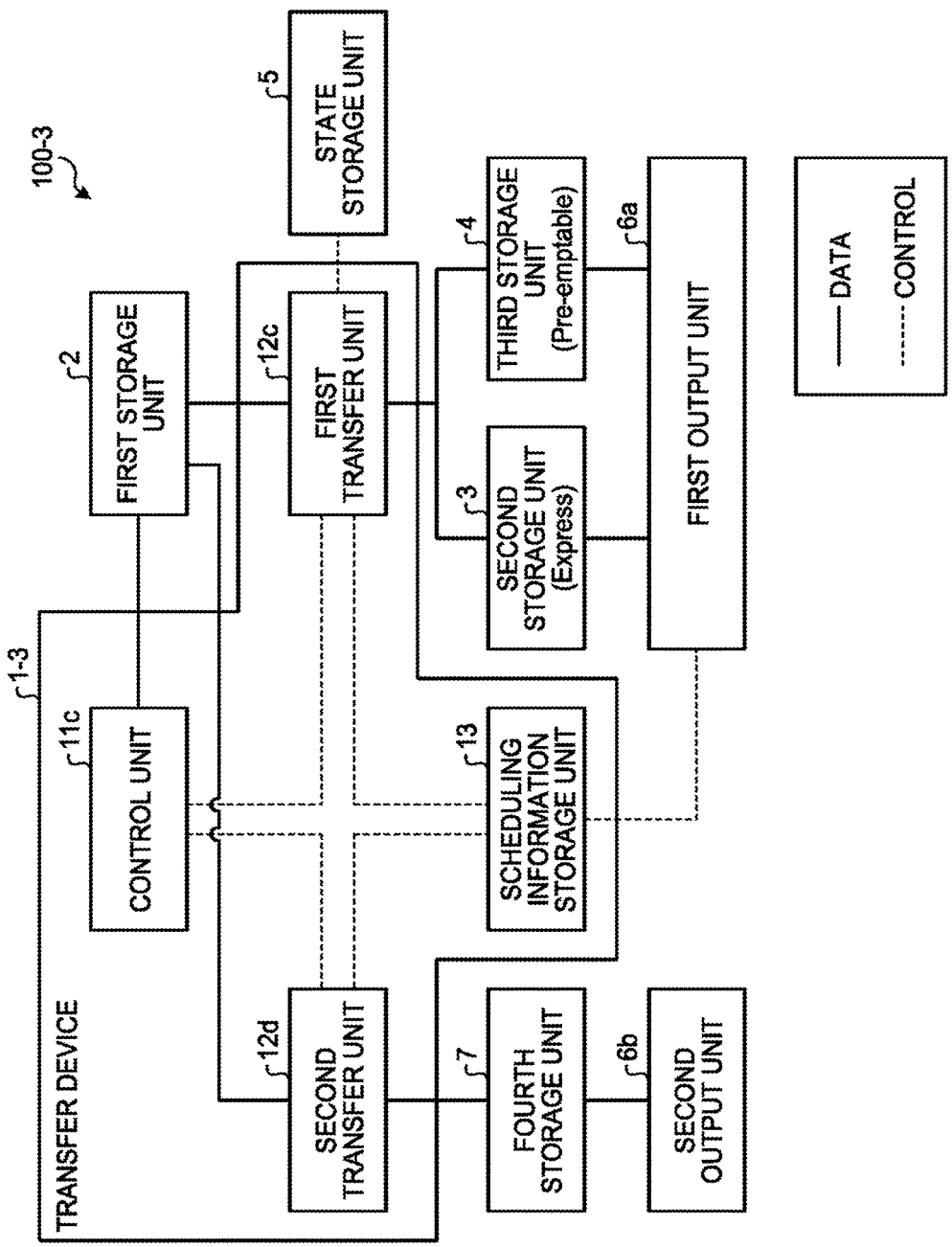
FIG. 16 is a diagram illustrating an example of a functional configuration of a communication device according to a third embodiment.

FIG. 16 is a diagram illustrating an example of a functional configuration of a communication device 100-3 according to the third embodiment. The communication device 100-3 according to the third embodiment includes a transfer device 1-3, the first storage unit 2, the second storage unit 3, the third storage unit 4, the state storage unit 5, and a first output unit 6a, a second output unit 6b, and a fourth storage unit 7. The transfer device 1-3 includes a control unit 11c, a first transfer unit 12c, a second transfer unit 12d, and the scheduling information storage unit 13.

The control unit 11c controls the entire communication device 100-3. Specifically, the control unit 11c controls (initializes and instructs data transfer, etc.) the first transfer unit 12c and the second transfer unit 2d, for example. Further, for example, the control unit 11c generates data such as a frame (packet) to be transmitted to a first device connected to the first output unit 6a and second device connected to the second output unit 6b. Further, for example, the control unit 11c generates scheduling information.

Since the operation of the first transfer unit 12c is the same as the operation of the transfer unit. 12 of the first embodiment, its explanation will be omitted.

The second transfer unit. 12d controls data transfer between the first storage unit 2 and the fourth storage unit 7. The second transfer unit 12d determines, by referring to the above-described scheduling information, a maximum data request size to be used in the process of issuing a read request to the first storage unit 2 and the process of issuing a write request to the first storage unit 2.

The fourth storage unit 7 has a buffer area for exchanging data with the second device. The specific form of the fourth storage unit 7 may be arbitrary. The fourth storage unit 7 is a storage device such as an SRAM, an SDRAM, an SSD, a HDD, an SD card, or the like.

The first output unit 6a executes data exchanging with the first device. The first device connected to the first output unit 6a is, for example, communication equipment.

The second output unit 6b executes data exchanging with the second device. The second device may be arbitrary. The second device is, for example, communication equipment, a storage device, a graphic processing device, or the like.

The description of the transfer process of data to be output to the first device is the same as that of the first embodiment and will therefore be omitted. Hereinafter, the transfer process of data to be output to the second device will be described.

First, the control unit 11c instructs the second transfer unit 12d and the second output unit 6b to transfer and output data to and from the second device. The second transfer unit 12d executes a data transfer process between the first storage unit 2 and the fourth storage unit 7 based on the transfer information instructed from the control unit 11c. The transfer information includes, for example, a transfer data size, a read source address, a destination address, and the like.

When data is output from the second output unit 6b, the read source is the first storage unit 2 and the write destination is the fourth storage unit 7. When data is acquired from the second output unit 6b, the read source is the fourth storage unit 7 and the write destination is the first storage unit 2.

Here, the data transfer process with the second device is executed asynchronously with the data transfer process with the first device. The first and second devices share the first storage unit 2 and the bus. Therefore, when the access load of the first storage unit. 2 and the bus increases due to the data transfer process with the second device, the transmission timing of the data with the high priority (first priority) of the first device can be influenced.

As described above, data requiring real-time communication such as control signals of devices is assumed for high priority data. The load of the data transfer process with the second device becomes high and if the transmission timing of these real time communication is influenced, there is a possibility that a serious problem may occur in the entire system. Therefore, the second transfer unit 12d specifies processing timing of the first output unit 6a by referring to the scheduling information, and determines the above-described maximum data request size when accessing the first storage unit 2 in consideration of the processing timing. Specifically, as in the first embodiment, the second transfer unit 12d sets a small value (for example, a value less than the threshold value) to the maximum data request size if there is a possibility that high-priority data transfer occurs, and if there is no possibility of occurrence, sets a large value (for example, a value equal to or larger than the threshold value). In addition, when high-priority data writing process occurs in the second storage unit 3 for data transfer to the first device, the second transfer unit 12d may perform control so as not to issue a request to the first storage unit 2.

As described above, in the communication device 100-3 (transfer device 1-3) of the third embodiment, the second transfer unit 12d specifies processing timing of the first output unit 6a by referring to the scheduling information, and determines the above-described maximum data request size when accessing the first storage unit 2 in consideration of the processing timing. Thus, it is possible to minimize the influence of the data transfer process with the second device operating asynchronously with the data transfer process with the first device on the data transfer process with the first device. For example, in the data transfer with first device, when a transfer process of high priority data occurs during a transfer process of low priority data, the overall transfer efficiency can be maximized while enabling immediate the transfer process to be interrupted.

Fourth Embodiment

Next, a fourth embodiment will be described. In the description according to the fourth embodiment, the same explanation as in the first embodiment will be omitted, and portions different from the first embodiment will be described. In the description of the fourth embodiment, a more specific configuration will be exemplified and explained.

Figure 17:
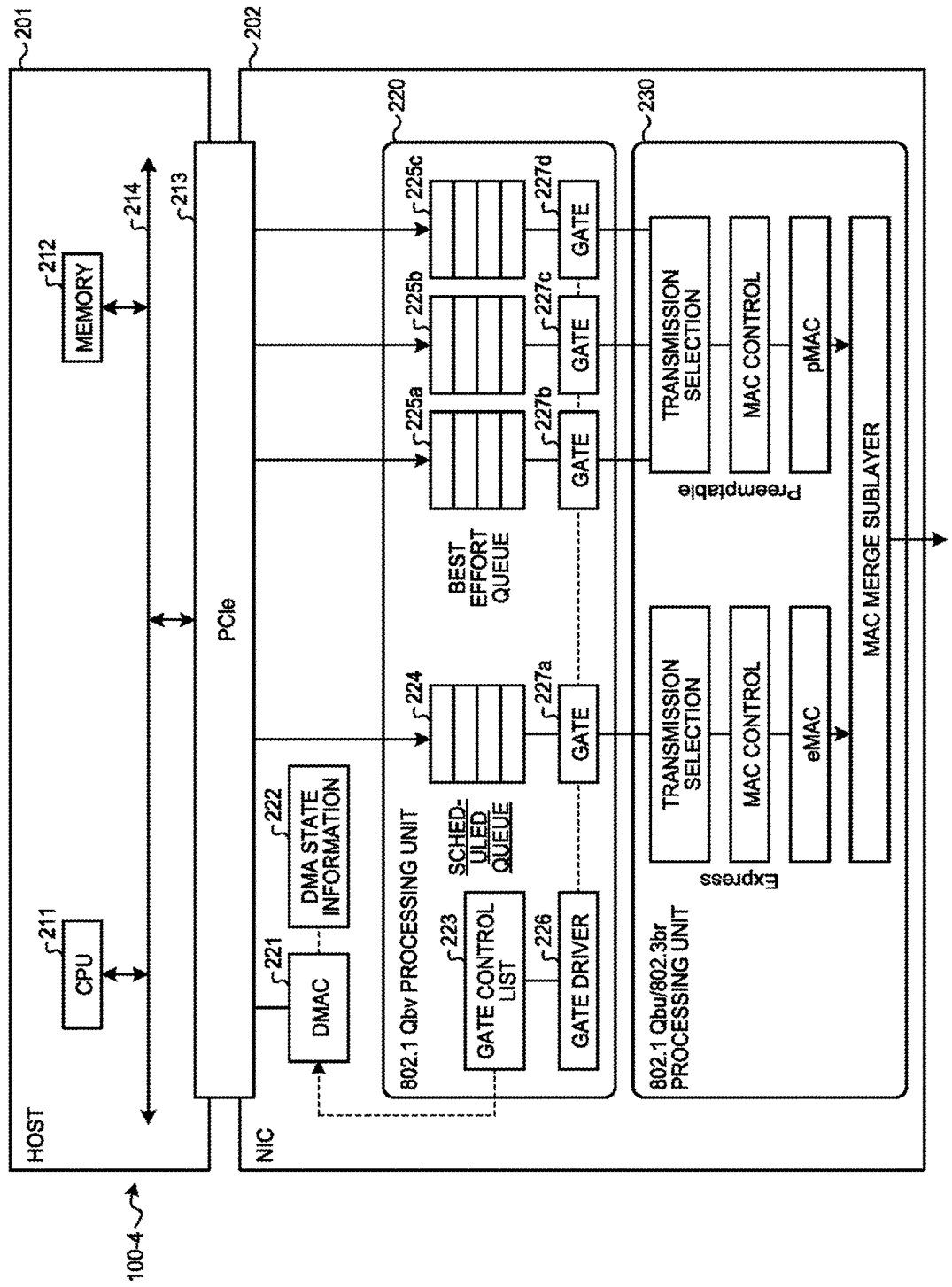
FIG. 17 is a diagram illustrating an example of a configuration of a communication device according to a fourth embodiment.

FIG. 17 is a diagram illustrating an example of a functional configuration of a communication device 100-4 according to the fourth embodiment. The communication device 100-4 of the fourth embodiment includes a host 201 and a NIC 202. The host 201 includes a CPU 211 and a memory 212. The CPU 211, the memory 212, and the PCIe 213 are connected via a bus 214.

The host 201 and the NIC 202 are connected via the PCIe 213. Note that the connection method between the host 201 and the NIC 202 is not limited to the PCIe 213, and other methods may be used.

The NIC 202 includes a DMAC 221, DMA state information 222, 802.1 Qbv processing unit 220, and 802.1 Qbu/802.3br processing unit 230.

The CPU 211 executes various types of processing of the entire communication device 100-4. The CPU 211 executes processing of each application, communication protocol processing, initialization processing and control processing of the NIC 202, and the like. The CPU 211 corresponds to, for example, the above-described control unit 11.

The memory 212 stores an application program, application data, an operating system (OS), a protocol stack, and the like.

The 802.1 Qbv processing unit 220 executes processing of IEEE 802.1 Qbv.

Specifically, transmission queues 224 and 225a to 225c tore data to be transferred. The transmission queue 224 (scheduled queue) stores, for example, data of traffic requiring real time property. The transmission queue 224 corresponds to, for example, the above-described second storage unit 3. The transmission queues 225a to 225c (best effort queue) store, for example, best effort traffic data. The transmission queues 225a to 225c correspond to, for example, the above-described third storage unit 4. The data to be transferred is stored in one of the transmission queues 224 and 225a to 225c, for example, based on a traffic class to which the data to be transferred belongs.

The gate driver 226 controls opening and closing of gates 227a to 227d of the respective transmission queues 224 and 225a to 225c at the timing set in a gate control list 223 of IEEE 802.1 Qbv. This makes it possible to control the transmission timing of each traffic class at the scheduled timing. The gate driver 226 corresponds to, for example, the above-described output unit 6. The gate control list 223 corresponds to, for example, the scheduling information stored in the above-described scheduling information storage unit 13.

Gate open/close information (scheduling information) set in the gate control list 223 may be set by a control application operating on the CPU 211, and may be set from an external device based on IEEE 802.1 Qcc (stream reservation protocol) or the like. Here, among the traffic classes, the transmission queue 224 is connected to an eMAC, and the transmission queues 225a to 225c are connected to a pMAC.

The 802.1 Qbu/802.3br processing unit 230 executes processing of IEEE 802.1 Qbu/IEEE 802.3br. Specifically, when data (Express) is written into the transmission queue 224 while the pMAC is transmitting data (Preemptable) stored in the transmission queues 225a to 225c, the 802.1 Qbu/802.3br processing unit 230 stops the processing of the pMAC and interrupts the processing of the eMAC. When the eMAC processing is completed, the 802.1 Qbu/802.3br processing unit 230 restarts the processing of pMAC. This makes it possible to transmit high priority data with low latency.

The DMAC 221 corresponds to, for example, the above-described transfer unit 12. The DMA state information 222 corresponds to, for example, the state information stored in the above-described state storage unit 5. The DMAC 221 determines a maximum data request size when accessing the memory 212 by referring to the gate control list 223. Thus, the maximum data request size can be determined in conjunction with the transmission control of 802.1 Qbv. Therefore, high priority data can be immediately input to the transmission queue 224 (scheduled queue) from the buffer (the application buffer and the buffer of the protocol stack, and the like) prepared in the memory 212.

As described above, in the communication device 100-4 of the fourth embodiment, the CPU 211 or the DMAC 221 changes the maximum data request size using the gate control list 223. As a result, while Express data of IEEE 802.1 Qbu/IEEE 802.3br can be immediately written in the transmission queue 224 (scheduled queue), it becomes possible to further increase the transmission efficiency of the data stored in the transmission queues 225a to 225c (best effort queue).

Modification of Fourth Embodiment

As a method of scheduling data transfer, a scheduling method for each packet and a scheduling method for each stream may be used.

Figure 18:
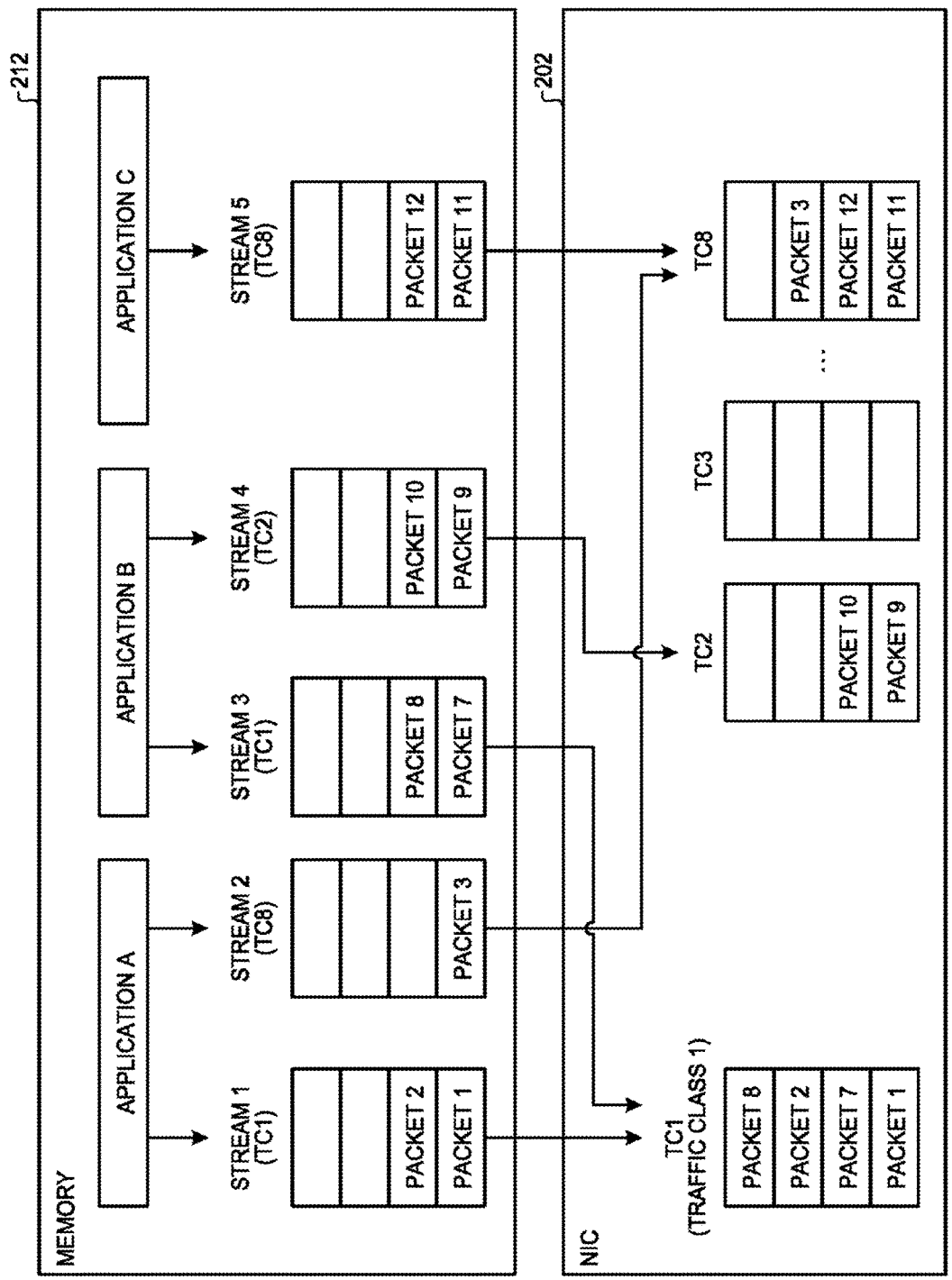
FIG. 18 is a view for explaining an example of a scheduling method according to a modified example of the fourth embodiment.

FIG. 18 is a view for explaining an example of a scheduling method according to a modified example of the fourth embodiment. In FIG. 18, buffers are held in the memory 212 on a per-stream basis depending on the destination address and priority of the communication partner. Each stream belongs to one of the traffic classes (TC).

Each of applications A to C controls the transmission timing for each packet and writes the packet in the buffer of the corresponding stream. In the example of FIG. 18, the timing of writing to the queue of the traffic class for each stream is controlled by communication processing such as a protocol stack or the like. Therefore, the CPU 211 or the DMAC 221 in FIG. 17 determines the above-described maximum data request size by referring to transmission scheduling information for each packet controlled by the applications A to C, and transmission scheduling information for each stream controlled by the protocol stack or the like. In addition, the CPU 211 or the DMAC 221 may determine the maximum data request size by referring to these plurality of pieces of scheduling information. Further, the CPU 211 or the DMAC 221 may determine the maximum data request size for each packet, for each stream, or for each traffic class.

Note that the communication device 100 (transfer device 1) according to the first to fourth embodiments can also be realized by using a general-purpose computer apparatus as basic hardware, for example. That is, among the functional configurations of the communication devices 100 according to the first to fourth embodiments, a function which can be implemented by a program can be implemented by causing a processor mounted on the computer apparatus to execute the program. At this time, the communication device 100 may be implemented by, for example, installing a program in the computer apparatus in advance. Furthermore, for example, the communication device 100 may be implemented by appropriately installing a program stored in a storage medium such as a CD-ROM in the computer apparatus. Furthermore, for example, the communication device 100 may be implemented by appropriately installing a program distributed via a network in the computer apparatus.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A transfer device comprising:
one or more hardware processors configured to function as a control unit and a first transfer unit, wherein
the control unit is configured to, by referring to scheduling information indicating a schedule of a timing at which data transfer occurs, dynamically control a maximum data request size that transfer of the data from a first storage unit to a second storage unit is requestable without waiting for reception of read completion notification,
the first transfer unit is configured to read the data from the first storage unit and transfer the data to the second storage unit in units of maximum data transfer size equal to or less than the maximum data request size,
the scheduling information includes information indicating a transfer priority of the data,
at a timing when a transfer interruption of first data may occur during transfer of second data having a transfer priority lower than that of the first data, the control unit controls a maximum data request size of the second data to have a value less than a threshold value, and
at a timing when the transfer interruption is unlikely to occur, the control unit controls the maximum data request size of the second data to have a value equal to or larger than the threshold value.

2. The device according to claim 1, further comprising a state storage device configured to store state information indicating a state of the second data whose transfer is interrupted by the transfer interruption, wherein
the first transfer unit restarts the interrupted transfer of the second data by referring to the state information after a transfer of the first data is completed.

3. The device according to claim 1, wherein
the one or more hardware processors are further configured to function as a second transfer unit configured to read the second data from the first storage unit, divide the second data into units of maximum data transfer size of the second data, and transfer the divided data pieces to a third storage unit,
the first transfer unit reads the first data from the first storage unit, divides the first data into units of maximum data transfer size of the first data, and transfers the divided data pieces to the second storage unit, and
the control unit dynamically controls a maximum data request size that transfer of the second data from the first storage unit to the third storage unit is requestable without waiting for reception of the read completion notification by referring to the scheduling information, and interrupts the transfer of the second data by the second transfer unit in a case where transfer interruption of the first data by the first transfer unit occurs when the second data is being transferred by the second transfer unit.

4. The device according to claim 1, wherein
the control unit, by referring to the scheduling information, dynamically controls a maximum data request size that transfer of the second data from the first storage unit to a third storage unit is requestable without waiting for reception of a read completion notification,
the first transfer unit divides the first data into units of maximum data transfer size of the first data and transfers the divided data pieces to the second storage unit when reading the first data from the first storage unit, the first transfer unit divides the second data for each of the maximum data transfer sizes of the second data and transferring the divided data to the third storage unit when reading the second data from the first storage unit, and the first data stored in the second storage unit and the second data stored in the third storage unit are output to first equipment.

5. The device according to claim 4, wherein the control unit by referring to the scheduling information, further dynamically controls a maximum data request size that transfer of the third data from the first storage unit to a fourth storage unit is requestable without waiting for reception of a read completion notification, the one or more hardware processors are further configured to function as a second transfer unit configured to read the third data from the first storage unit, divide the third data into units of maximum data transfer size of the third data, and transfer the divided data pieces to the fourth storage unit, and the third data stored in the fourth storage unit is output to second equipment.

6. The device according to claim 1, wherein the scheduling information is a gate control list of IEEE 802.1 Qbv.

7. The device according to claim 1, wherein the data is a frame to be transmitted to communication equipment, and the control unit determines the maximum data request size for each frame.

8. The device according to claim 1, wherein the data is a frame transmitted to communication equipment, and the control unit determines the maximum data request size for each stream to which the frame belongs.

9. The device according to claim 1, wherein the data is a frame to be transmitted to communication equipment, and the control unit determines the maximum data request size for each traffic class to which the frame belongs.

10. A transfer method comprising:

dynamically controlling, by referring to scheduling information indicating a schedule of a timing at which data transfer occurs, a maximum data request size that transfer of the data from a first storage unit to a second storage unit is requestable without waiting for reception of read completion notification; and reading the data from the first storage unit and transferring the data to the second storage unit in units of maximum data transfer size equal to or less than the maximum data request size, wherein the scheduling information includes information indicating a transfer priority of the data, at a timing when a transfer interruption of first data is likely to occur during transfer of second data having a transfer priority lower than that of the first data, the dynamically controlling controls a maximum data request size of the second data to have a value less than a threshold value, and at a timing when the transfer interruption is unlikely to occur, the dynamically controlling controls the maximum data request size of the second data to have a value equal to or larger than the threshold value.

11. A computer program product comprising a non-transitory computer readable medium including programmed instructions, the instructions, when executed by a computer, causing the computer to perform:

dynamically controlling, by referring to scheduling information indicating a schedule of a timing at which data transfer occurs, a maximum data request size that transfer of the data from a first storage unit to a second storage unit is requestable without waiting for reception of read completion notification; and reading the data from the first storage unit and transferring the data to the second storage unit in units of maximum data transfer size equal to or less than the maximum data request size, wherein the scheduling information includes information indicating a transfer priority of the data, at a timing when a transfer interruption of first data is likely to occur during transfer of second data having a transfer priority lower than that of the first data, the dynamically controlling controls a maximum data request size of the second data to have a value less than a threshold value, and at a timing when the transfer interruption is unlikely to occur, the dynamically controlling controls the maximum data request size of the second data to have a value equal to or larger than the threshold value.

* * * * *